US012109808B2

(12) United States Patent
Hamada et al.

(10) Patent No.: US 12,109,808 B2
(45) Date of Patent: Oct. 8, 2024

(54) RECORDING APPARATUS AND CONTROL METHOD

(71) Applicant: CANON KABUSHIKI KAISHA, Tokyo (JP)

(72) Inventors: Yoshihiro Hamada, Kanagawa (JP); Takahiro Matsui, Kanagawa (JP); Takatsugu Moriya, Tokyo (JP); Nobuyuki Hirayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 17/858,156

(22) Filed: Jul. 6, 2022

(65) Prior Publication Data

US 2023/0008821 A1 Jan. 12, 2023

(30) Foreign Application Priority Data

Jul. 7, 2021 (JP) ................................. 2021-112990

(51) Int. Cl.
*B41J 2/045* (2006.01)

(52) U.S. Cl.
CPC ......... *B41J 2/04563* (2013.01); *B41J 2/0458* (2013.01)

(58) Field of Classification Search
CPC .... B41J 2/04563; B41J 2/0458; B41J 2/0454; B41J 2/04591; B41J 2/04581; B41J 2/04541; B41J 2/14129; B41J 29/38; B41J 2/14072; B41J 2/2142; B41J 29/393; B41J 2/14153; B41J 2/04588; B41J 2002/14354
See application file for complete search history.

(56) References Cited

U.S. PATENT DOCUMENTS

| | | | |
|---|---|---|---|
| 5,963,713 | A | 10/1999 | Inose et al. |
| 5,969,730 | A | 10/1999 | Inose et al. |
| 6,068,359 | A | 5/2000 | Inose et al. |
| 6,505,904 | B1 | 1/2003 | Hirayama |

(Continued)

FOREIGN PATENT DOCUMENTS

| | | | |
|---|---|---|---|
| CN | 1636735 | A | 7/2005 |
| CN | 1736716 | A | 2/2006 |

(Continued)

OTHER PUBLICATIONS

Apr. 26, 2024 Chinese Official Action in Chinese Patent Appln. No. 202210785923.7.

*Primary Examiner* — Jannelle M Lebron
(74) *Attorney, Agent, or Firm* — Venable LLP

(57) ABSTRACT

A recording apparatus includes: a liquid ejection head including a heating element, a first protection layer that blocks contact between the heating element and liquid, a second protection layer that covers at least a portion of the first protection layer to be heated by the heating element and that functions as a first electrode, a second electrode that is electrically connected to the first electrode through the liquid, an ejection port that ejects the liquid, and a temperature detection element that corresponds to the heating element, and a detection unit configured to detect a feature point in a temperature curve that indicates a relationship between time and temperature, in which a combination of a potential set for the first electrode and a potential set for the second electrode in a case where printing is performed varies from that in a case where the detection unit detects the feature point.

15 Claims, 24 Drawing Sheets

(56) References Cited

U.S. PATENT DOCUMENTS

| | | | |
|---|---|---|---|
| 6,547,367 | B1 | 4/2003 | Hamada |
| 6,582,045 | B2 | 6/2003 | Hirayama |
| 6,994,417 | B2 | 2/2006 | Murayama et al. |
| 7,172,268 | B2 | 2/2007 | Oikawa |
| 7,374,275 | B2 | 5/2008 | Shibata |
| 7,673,961 | B2 | 3/2010 | Shihoh et al. |
| 7,722,148 | B2 | 5/2010 | Takabayashi et al. |
| 7,950,765 | B2 | 5/2011 | Takabayashi et al. |
| 7,954,238 | B2 | 6/2011 | Shibata |
| 8,100,511 | B2 | 1/2012 | Kim |
| 8,172,355 | B2 | 5/2012 | Takabayashi et al. |
| 8,186,798 | B2 | 5/2012 | Aoki et al. |
| 9,283,749 | B2 | 3/2016 | Hamada et al. |
| 9,327,499 | B2 | 5/2016 | Sakurai |
| 9,409,390 | B1 | 8/2016 | Nishikori et al. |
| 9,975,347 | B2 | 5/2018 | Tozuka et al. |
| 10,710,361 | B2 | 7/2020 | Misumi |
| 10,960,665 | B2 | 3/2021 | Nomura et al. |
| 10,987,921 | B2 | 4/2021 | Iwasaki et al. |
| 10,994,532 | B2 | 5/2021 | Ishida et al. |
| 2001/0038396 | A1 | 11/2001 | Imanaka |
| 2005/0140734 | A1 | 6/2005 | Oikawa |
| 2006/0033778 | A1 | 2/2006 | Shibata |
| 2007/0291067 | A1 | 12/2007 | Aoki et al. |
| 2007/0291069 | A1 | 12/2007 | Shihoh et al. |
| 2008/0188018 | A1 | 8/2008 | Shibata |
| 2009/0309932 | A1 | 12/2009 | Kim |
| 2010/0194810 | A1 | 8/2010 | Takabayashi et al. |
| 2011/0164085 | A1 | 7/2011 | Takabayashi et al. |
| 2011/0292131 | A1 | 12/2011 | Wei |
| 2015/0015632 | A1* | 1/2015 | Sakurai ................ B41J 2/14129 347/14 |
| 2019/0061343 | A1* | 2/2019 | Misumi ................ B41J 2/04541 |

FOREIGN PATENT DOCUMENTS

| | | | |
|---|---|---|---|
| CN | 101607472 | A | 12/2009 |
| CN | 104275932 | A | 1/2015 |
| CN | 109421372 | A | 3/2019 |
| JP | 2002-205398 | A | 7/2002 |
| JP | 2004-009491 | A | 1/2004 |
| JP | 2005-231175 | A | 9/2005 |
| JP | 2007-290361 | A | 11/2007 |
| JP | 2007-331193 | A | 12/2007 |
| JP | 2008-000914 | A | 1/2008 |

* cited by examiner (b)

| | PRINTING MODE | | NON-EJECTION DETERMINATION MODE | |
|---|---|---|---|---|
| CONDITION EXAMPLE | UPPER PROTECTION LAYER | OPPOSING ELECTRODE | UPPER PROTECTION LAYER | OPPOSING ELECTRODE |
| (1) | 0.0V | +1.9V | +1.8V | +1.9V |
| (2) | 0.0V | +1.9V | +0.9V | +1.9V |
| (3) | 0.0V | +1.9V | +0.1V | +1.9V |
| (4) | 0.0V | +1.9V | +0.2V | +1.9V |
| (5) | 0.0V | +1.9V | +0.3V | +1.9V |
| (6) | 0.0V | +1.9V | +0.4V | +1.9V |
| (7) | 0.0V | +1.9V | +0.0V | +1.0V |
| (8) | 0.0V | +1.9V | 0.0V | −2.5V |
| (9) | 0.0V | −2.5V | +1.9V | +2.0V |
| (10) | +2.5V | 0.0V | −0.1V | 0.0V |
| (11) | 0.0V | +0.5V | 0.0V | +1.5V |

FIG.22

RECORDING APPARATUS AND CONTROL METHOD

BACKGROUND

Field

The present disclosure relates to a recording apparatus including a liquid ejection head that ejects liquid such as inks.

Description of the Related Art

In a recording head included in an inkjet recording apparatus, ejection failure occurs in some or all of nozzles due to clogging of nozzles by foreign objects, air bubbles mixed into ink supply paths, a change in wettability of nozzle surfaces, or the like. Accordingly, in such a recording head, it is necessary to determine the nozzles in which ejection failure has occurred and reflect the determined nozzles in image complement and recovery work of the recording head.

Japanese Patent Laid-Open No. 2007-290361 proposes a method in which a temperature detection element formed of a thin film resistor is provided on each of recording elements including heating elements via an insulating film in a recording element board, temperature of each nozzle is detected, and a nozzle with ejection failure is determined depending on how the temperature changes.

Moreover, Japanese Patent Laid-Open Nos. 2007-331193 and 2008-000914 propose an inspection method in which it is determined whether or not a temperature drop instance of a temperature curve includes an inflection point indicating occurrence of a rapid temperature drop change and, in the case where the inflection point is present, ejection is determined to be normal. Note that this inflection point is assumed to occur in the case where a rear end of an ejected liquid droplet comes into contact with the recording element and cools the recording element.

SUMMARY

However, the method disclosed in Japanese Patent Laid-Open Nos. 2007-331193 and 2008-000914 has such a problem that, in a situation where contact of the ejected liquid drop rear end with the recording element is unstable, temperature decrease of the recording element does not stably occur and thus detection accuracy decreases. For example, in a nozzle dimension in which the contact of the ejected liquid droplet rear end tends to be unstable, the temperature decrease of the recording element becomes unstable and a situation where detection accuracy decreases tends to occur. Moreover, since the contact of the ejected liquid droplet rear end is unstable also in a location where atmospheric pressure is low such as highlands, the temperature decrease of the recording element becomes unstable and a situation where detection accuracy decreases tends to occur.

Thus, in view of the aforementioned problems, an object of the present disclosure is to provide a technique for grasping the ejection state in the recording element and accurately performing determination of ejection failure occurrence.

An aspect according to the present invention is a recording apparatus that includes: a liquid ejection head including a heating element that generates thermal energy required to eject liquid, a first protection layer that blocks contact between the heating element and the liquid, a second protection layer that covers at least a portion of the first protection layer to be heated by the heating element and that functions as a first electrode, a second electrode that is electrically connected to the first electrode through the liquid, an ejection port that ejects the liquid, and a temperature detection element that corresponds to the heating element, and a detection unit configured to detect a feature point in a temperature curve that is obtained by the temperature detection element and that indicates a relationship between time and temperature, in which a combination of a potential set for the first electrode and a potential set for the second electrode in a case where printing is performed varies from that in a case where the detection unit detects the feature point.

Further features of the present invention will become apparent from the following description of exemplary embodiments with reference to the attached drawings.

BRIEF DESCRIPTION OF THE DRAWINGS

FIG. 22 is a table in which values of various condition examples are held.

DESCRIPTION OF THE EMBODIMENTS

Figure 1:
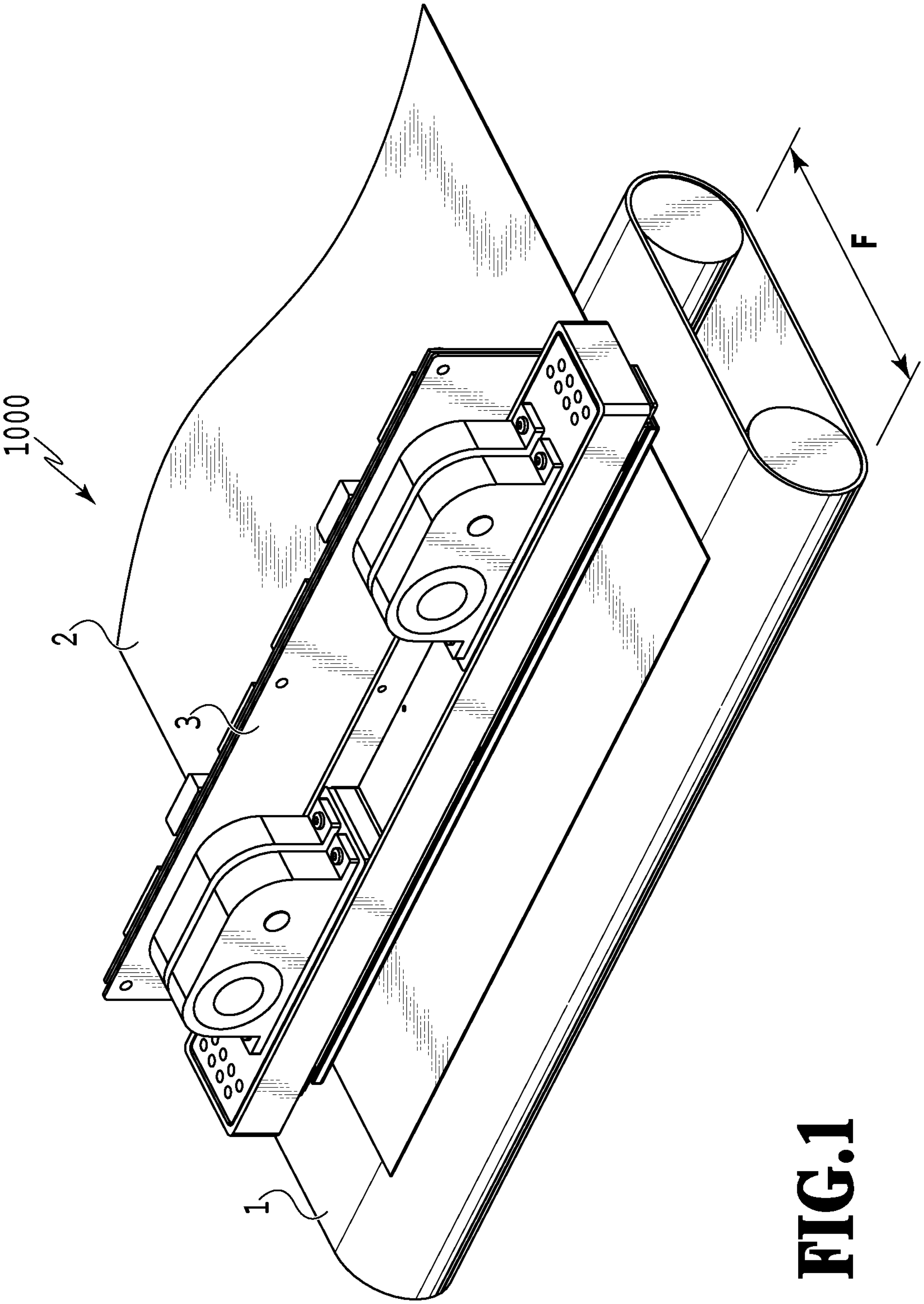
FIG. 1 is a view illustrating a schematic configuration of a recording apparatus 1000 according to a first embodiment.

A recording apparatus employing an inkjet recording method is described below as an example according to the embodiments of the present disclosure. The recording apparatus may be, for example, a single function printer having only a recording function or a multi-function printer having multiple functions such as the recording function, a facsimile function, and a scanner function. Moreover, the present disclosure may be applied to a manufacturing apparatus for manufacturing a color filter, an electronic device, an optical device, a fine structure, or the like by using a predetermined recording method.

Note that, in the following description, "record" does not refer only to the case of forming meaningful information such as letters and figures and products to be recorded may be meaningful or meaningless. Moreover, "record" widely refers to the case of forming images, designs, patterns, structures, and the like on a record medium or the case of processing the media, regardless of whether or not the recorded product is apparent to be visually noticeable by human.

Moreover, the "record medium" refers not only to general paper used in a recording apparatus but also to media that can receive ink such as cloth, a plastic film, a metal plate, glass, ceramic, resin, wood, and leather.

Furthermore, the "ink" should be widely interpreted like the aforementioned definition of "record". Accordingly, the "ink" refers to a liquid that can be used to form images, designs, patterns, and the like, process the record medium, or treat an ink (for example, solidify or insolubilize a colorant in the ink applied to the record medium) by being applied onto the record medium.

Moreover, the "recording element" (also referred to as "nozzle" in some cases) refers to an ink ejection port, a liquid passage communicating therewith, and an element that generates energy used for ink ejection as whole unless otherwise noted.

First Embodiment

Although the present embodiment relates to an inkjet recording apparatus of a mode in which liquid such as an ink is circulated between a tank and a liquid ejection head, the mode of the inkjet recording apparatus may be different. For example, the mode may be such that, instead of circulating the ink, two tanks are provided upstream and downstream of the liquid ejection head and the ink is made to flow from one tank to the other tank to cause the ink in a pressure chamber to flow.

Moreover, although the liquid ejection head according to the present embodiment is a liquid ejection head, e.g., a line-type head having a length corresponding to the width of a recording medium, the present embodiment can be also applied to a so-called serial-type liquid ejection head that performs recording while scanning the recording medium. Although a configuration in which one recording element board for a black ink and one recording element board for color inks are mounted can be given as an example of the configuration of the serial liquid ejection head, the configuration is not limited to this. Specifically, the mode may be as follows: a short line head that has a smaller width than the recording medium and in which multiple recording element boards are arranged such that ejection port nozzle rows overlap one another in an ejection port nozzle row direction is fabricated and made to scan the recording medium.

<Inkjet Recording Apparatus>

FIG. 1 illustrates a schematic configuration of a liquid ejection apparatus according to the present embodiment, specifically an inkjet recording apparatus 1000 (hereinafter, also referred to as recording apparatus) that performs recording by ejecting inks. The recording apparatus 1000 includes a conveyance unit 1 that conveys recording media 2 and a line-type liquid ejection head 3 that is arranged to be substantially orthogonal to a conveyance direction of the recording medium, and is a line-type recording apparatus that performs continuous recording in one pass while continuously or intermittently conveying multiple recording media 2. The recording media 2 are not limited to cut paper and may be continuous roll paper. The liquid ejection head 3 is capable of performing full color printing by using cyan, magenta, yellow, and black (CMYK) inks. In the liquid ejection head 3, a main tank, a buffer tank, and a liquid supplying unit that forms a supply passage for supplying the inks to the liquid ejection head as described later are fluidly connected to one another (see FIGS. 2A and 2B). Moreover, an electric control unit that sends electric power and ejection control signals to the liquid ejection head 3 is electrically connected to the liquid ejection head 3. Liquid paths and electrical signal paths in the liquid ejection head 3 are described later.

<First Circulation Path>

Figure 2A:
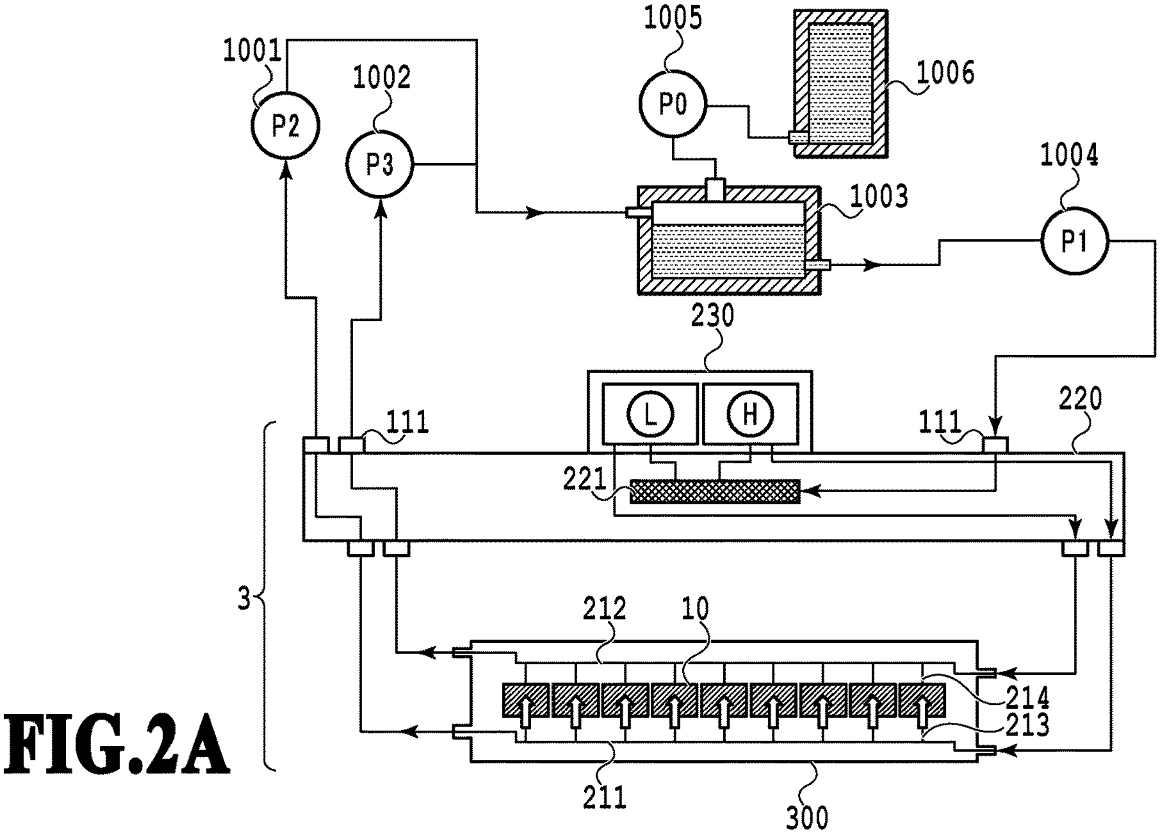
FIGS. 2A and 2B are diagrams illustrating circulation paths in the recording apparatus 1000.

FIG. 2A is a schematic view illustrating a first circulation path as one mode of a circulation path applied to the recording apparatus according to the present embodiment. As illustrated in FIG. 2A, the liquid ejection head 3 is fluidly connected to a first circulation pump (high pressure side) 1001, a first circulation pump (low pressure side) 1002, a buffer tank 1003, and the like. Although a path in which only one of the CMYK inks flows is illustrated in FIG. 2A to simplify the explanation, circulation paths for the four colors are actually provided in the liquid ejection head 3 and a recording apparatus main body.

The buffer tank 1003 that is connected to a main tank 1006 and that serves as a sub tank has an atmosphere communication port (not illustrated) that allows the inside and the outside of the tank to communicate with each other, and air bubbles in the ink can be discharged to the outside. The buffer tank 1003 is also connected to a replenishing pump 1005. In the case where the ink is consumed in the liquid ejection head 3, the replenishing pump 1005 transfers the ink equivalent to a consumed amount from the main tank 1006 to the buffer tank 1003. The ink is consumed in the liquid ejection head 3, for example, in the case where the ink is ejected (discharged) from the ejection port of the liquid ejection head in operations such as recording and suction recovery performed by ejecting the ink.

The two first circulation pumps 1001 and 1002 have a role of pumping out the ink from liquid connecting portions 111 of the liquid ejection head 3 and causing the ink to flow to the buffer tank 1003. The first circulation pumps are each preferably a displacement pump that has a quantitative liquid sending capability. Specifically, a tube pump, a gear pump, a diaphragm pump, a syringe pump, and the like can be given as examples. For example, a mode of securing a constant flow rate by arranging a general constant flow rate valve or a relief valve at a pump outlet may also be used. In driving of the liquid ejection head 3, the first circulation pump (high pressure side) 1001 and the first circulation pump (low pressure side) 1002 cause the ink to flow at a constant rate in each of a common supply flow passage 211 and a common collection flow passage 212. The flow rate is preferably set equal to or higher than such a flow rate that temperature differences among recording element boards 10 in the liquid ejection head 3 is at a level at which recorded image quality is not affected. However, in the case where an excessively high flow rate is set, negative pressure differences among the recording element boards 10 become too large due to an effect of pressure droplet in flow passages in a liquid ejection unit 300, and image density unevenness occurs. Accordingly, it is preferable to set the flow rate while taking the temperature differences and the negative pressure differences among the recording element boards 10 into consideration.

A negative pressure control unit 230 is provided in the middle of a path connecting a second circulation pump 1004 and the liquid ejection unit 300. Accordingly, the negative pressure control unit 230 has a function of operating such that pressure downstream (that is, on the liquid ejection unit 300 side) of the negative pressure control unit 230 is maintained at a preset constant pressure even in the case where the flow rate in a circulation system fluctuates due to a difference in duty of recording. Any mechanisms can be used as two pressure adjustment mechanisms that form the negative pressure control unit 230 as long as they can control the pressure downstream of the negative pressure control unit 230 such that the pressure fluctuates within a certain range centered at a desired set pressure. For example, a mechanism similar to a so-called "depressurization regulator" can be used. In the case where the depressurization regulator is used, as illustrated in FIG. 2A, the second circulation pump 1004 preferably applies pressure on the upstream side of the negative pressure control unit 230 via a liquid supply unit 220. Since this configuration can suppress an effect of a hydraulic head pressure of the buffer tank 1003 on the liquid ejection head 3, a degree of freedom in layout of the buffer tank 1003 in the recording apparatus 1000 can be improved. The second circulation pump 1004 only needs to be a pump that has a lifting range pressure of a certain pressure or higher in a range of an ink circulation flow rate used in the drive of the liquid ejection head 3, and a turbo pump, a displacement pump, or the like can be used. Specifically, a diaphragm pump or the like can be applied. Moreover, for example, a hydraulic head tank arranged to have a certain hydraulic head difference with respect to the negative pressure control unit 230 can be applied instead of the second circulation pump 1004.

As illustrated in FIG. 2A, the negative pressure control unit 230 includes the two pressure adjustment mechanisms for which different control pressures are set, respectively. A pressure adjustment mechanism on the higher pressure setting side (denoted by H in FIG. 2A) out of the two negative pressure adjustment mechanisms is connected to the common supply flow passage 211 in the liquid ejection unit 300 via an interior of the liquid supply unit 220. Meanwhile, a pressure adjustment mechanism on the lower pressure setting side (denoted by L in FIG. 2A) is connected to the common collection flow passage 212 via the interior of the liquid supply unit 220.

The liquid ejection unit 300 is provided with the common supply flow passage 211, the common collection flow passage 212, and individual supply flow passages 213 and individual collection flow passages 214 that communicate with the recording element boards 10. Since the individual supply flow passages 213 and the individual collection flow passages 214 communicate with the common supply flow passage 211 and the common collection flow passage 212, there is generated a flow (arrows in FIG. 2A) in which part of the ink flows from the common supply flow passage 211 to the common collection flow passage 212 while passing through internal flow passages of the recording element board 10. The reason for this is that, since the pressure adjustment mechanism H is connected to the common supply flow passage 211 and the pressure adjustment mechanism L is connected to the common collection flow passage 212, a differential pressure is generated between the two common flow passages.

As described above, in the liquid ejection unit 300, the flow in which part of the ink passes through interiors of the recording element boards 10 is generated while the ink flows to pass through interiors of the common supply flow passage 211 and the common collection flow passage 212. Accordingly, the flow through the common supply flow passage 211 and the common collection flow passage 212 allows heat generated in the recording element boards 10 to be discharged to the outside of the recording element boards 10. Moreover, since such a configuration can generate a flow of ink also in ejection ports and pressure chambers not performing recording while the liquid ejection head 3 performs the recording, an increase in the viscosity of the ink in such portions can be suppressed. Furthermore, the ink with increased viscosity and foreign objects in the ink can be discharged to the common collection flow passage 212. Accordingly, the liquid ejection head 3 of the present embodiment can perform high-quality recording at high speed.

<Second Circulation Path>

Figure 2B:
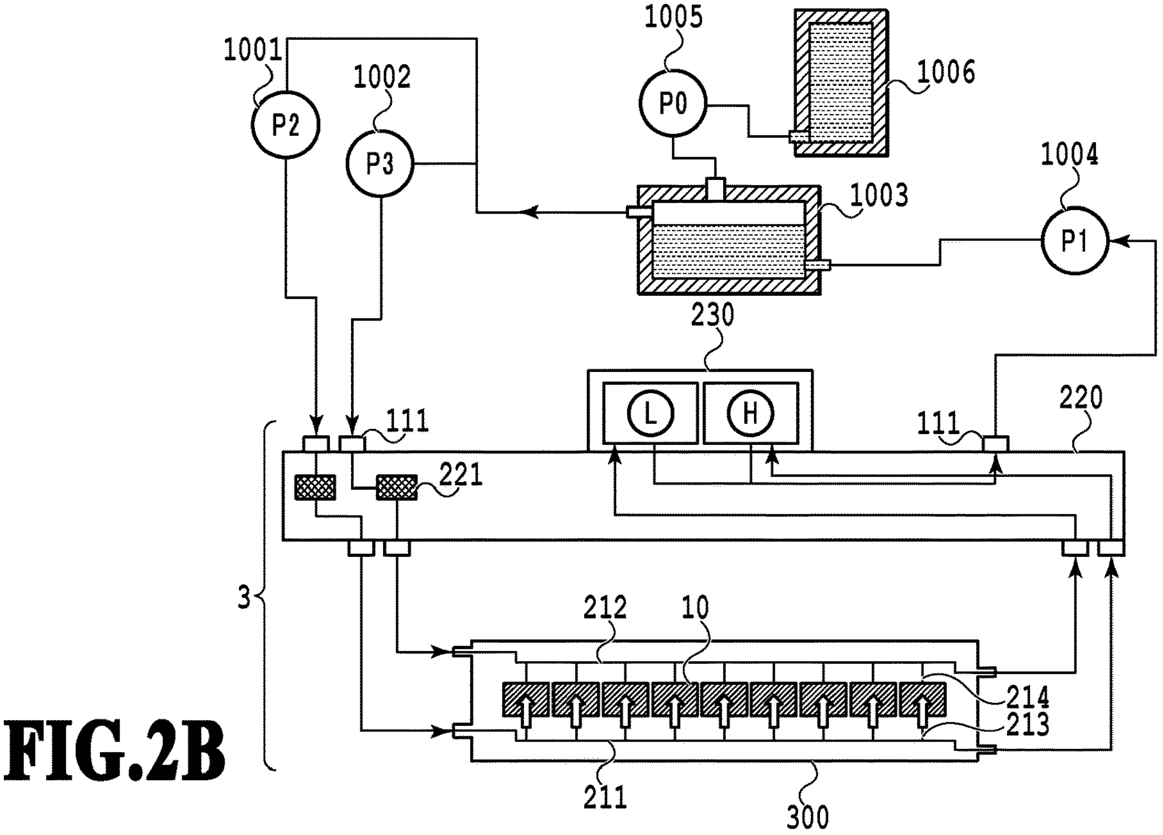

FIG. 2B is a schematic view illustrating a second circulation path different from the aforementioned first circulation path among circulation paths applied to the recording apparatus according to the present embodiment. Main differences from the first circulation path are as follows.

First, the two pressure adjustment mechanisms forming the negative pressure control unit 230 both have mechanisms (mechanism parts having the same functions as so-called "backpressure regulator") that control a pressure upstream of the negative pressure control unit 230 such that the pressure fluctuates within a certain range centered at a desired set pressure. Moreover, the second circulation pump 1004 functions as a negative pressure source that reduces pressure on the downstream side of the negative pressure control unit 230. Furthermore, the first circulation pump (high pressure side) 1001 and the first circulation pump (low pressure side) 1002 are arranged upstream of the liquid ejection head and the negative pressure control unit 230 is arranged downstream of the liquid ejection head.

The negative pressure control unit 230 in the second circulation path operates such that pressure upstream (that is, on the liquid ejection unit 300) of the negative pressure control unit 230 fluctuates within the certain range even in the case where a flow rate fluctuates due to changes in recording duty in the case where the liquid ejection head 3 performs the recording. The pressure fluctuates within, for example, a certain range centered at a preset pressure. As illustrated in FIG. 2B, the second circulation pump 1004 preferably applies pressure on the downstream side of the negative pressure control unit 230 via the liquid supply unit 220. Since this configuration can suppress an effect of a hydraulic head pressure of the buffer tank 1003 on the liquid ejection head 3, a degree of freedom in layout of the buffer tank 1003 in the recording apparatus 1000 can be improved. For example, a hydraulic head tank arranged to have a certain hydraulic head difference with respect to the negative pressure control unit 230 can be applied instead of the second circulation pump 1004.

As in the first circulation path, the negative pressure control unit 230 illustrated in FIG. 2B includes two pressure adjustment mechanisms for which different control pressures are set, respectively. A pressure adjustment mechanism on the higher pressure setting side (denoted by H in FIG. 2B) out of the two pressure adjustment mechanisms is connected to the common supply flow passage 211 in the liquid ejection unit 300 via the interior of the liquid supply unit 220. Meanwhile, a pressure adjustment mechanism on the lower pressure setting side (denoted by L in FIG. 2B) is connected to the common collection flow passage 212 via the interior of the liquid supply unit 220.

The two pressure adjustment mechanisms make the pressure in the common supply flow passage 211 higher than the pressure in the common collection flow passage 212. This configuration generates an ink flow in which the ink flows from the common supply flow passage 211 to the common collection flow passage 212 via the individual flow passages 213 and the internal flow passages of the recording element boards 10 (arrows in FIG. 2B). As described above, in the second circulation path, an ink flow state similar to that in the first circulation path is obtained in the liquid ejection unit 300. Meanwhile, the second circulation path has two advantages different from those of the first circulation path.

The first advantage is as follows: in the second circulation path, since the negative pressure control unit 230 is arranged downstream of the liquid ejection head 3, a risk that dusts and foreign objects generated in the negative pressure control unit 230 flow into the head is low. The second advantage is as follows: the maximum value of the flow rate necessary for supplying from the buffer tank 1003 to the liquid ejection head 3 in the second circulation path is smaller than that in the first circulation path. The reason for this is as follows. A total of the flow rates in the common supply flow passage 211 and the common collection flow passage 212 in the case where the ink is circulated in a recording standby period is referred to as A. The value of A is defined as the minimum flow rate necessary to cause the temperature difference in the liquid ejection unit 300 to fall within the desired range in the case where the temperature of the liquid ejection head 3 is adjusted during the recording standby period. Moreover, an ejection flow rate in the case where the ink is ejected from all ejection ports in the liquid ejection unit 300 (all ejection) is defined as F. Then, in the case of the first circulation path (FIG. 2A), a set flow rate of the first circulation pump (high pressure side) 1001 and the first circulation pump (low pressure side) 1002 is A. Accordingly, the maximum value of the liquid supply rate to the liquid ejection head 3 necessary in the all ejection is A+F.

Meanwhile, in the case of the second circulation path (FIG. 2B), the liquid supply rate to the liquid ejection head 3 necessary in the recording standby period is the flow rate A. The supply rate to the liquid ejection head 3 necessary in the all ejection is the flow rate F. Then, in the case of the second circulation path, the total value of the set flow rates of the first circulation pump (high pressure side) 1001 and the first circulation pump (low pressure side) 1002, that is the maximum value of the necessary supply flow rate is a value of the larger one of A and F. Accordingly, the maximum value (A or F) of the necessary supply rate in the second circulation path is inevitably smaller than the maximum value (A+F) of the necessary supply flow rate in the first circulation path, provided that the liquid ejection unit 300 with the same configuration is used. In the case of the second circulation path, the degree of freedom in applicable circulation pumps is thus improved. Accordingly, for example, it is possible to use low-cost circulation pumps with simple configurations or reduce load of a cooler (not illustrated) installed in a path on the main body side and the second circulation path has an advantage of enabling cost reduction of the recording apparatus main body. This advantage is greater in line heads in which the value of A or F is relatively large, and, among the line heads, a line head with a large length in the longitudinal direction benefits more.

Note that the first circulation path also has advantages over the second circulation path. Specifically, in the second circulation path, since the flow rate of the ink flowing in the liquid ejection unit 300 is maximum in the recording standby period, the lower the recording duty is, the higher the negative pressure applied to each nozzle is. Accordingly, particularly in the case where the flow passage widths (lengths in the direction orthogonal to the flow direction of the ink) of the common supply flow passage 211 and the common collection flow passage 212 are reduced to reduce a head width (length of the liquid ejection head in the direction of the shorter side), a high negative pressure is applied to the nozzle in a low duty image in which unevenness tends to be noticeable. Such application of a high negative pressure may increase effects of satellite droplets. Meanwhile, in the first circulation path, since the timing at which a high negative pressure is applied to the nozzle is in formation of a high duty image, there is such an advantage that, even in the case where satellite droplets are generated, the satellite droplets are less noticeable and effects thereof on the recorded image are small. A preferable one of the two circulation paths can be selected and employed depending on the specifications (ejection flow rate F, minimum circulation flow rate A, and in-head flow passage resistance) of the liquid ejection head and the recording apparatus main body.

<Configuration of Liquid Ejection Head>

Figure 3A:
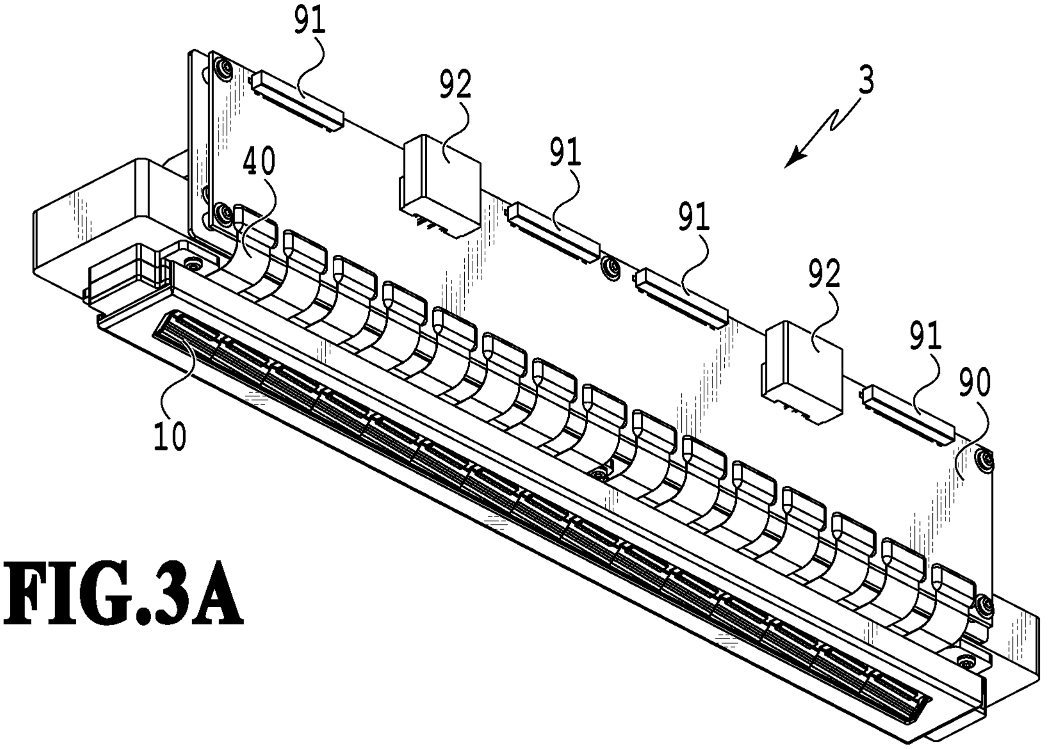
FIGS. 3A and 3B are perspective views of a liquid ejection head 3 according to the first embodiment.
Figure 3B:
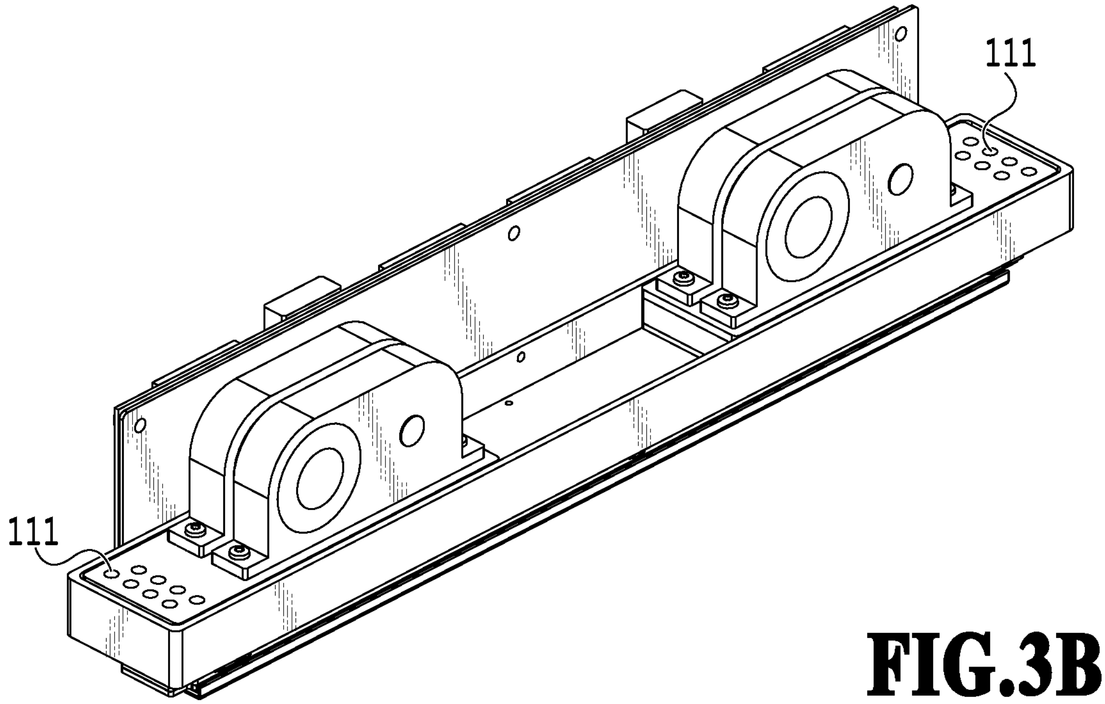

A configuration of the liquid ejection head 3 according to the first embodiment is described. FIGS. 3A and 3B are perspective views of the liquid ejection head 3 according to the present embodiment. The liquid ejection head 3 is a line type liquid ejection head in which 15 recording element boards 10 each capable of ejecting the inks of four colors of C, M, Y, and K are aligned in a straight line (arranged in line). As illustrated in FIG. 3A, the liquid ejection head 3 includes signal input terminals 91 and electric power supply terminals 92 electrically connected to the recording element boards 10 via flexible wiring boards 40 and an electric wiring board 90. The signal input terminals 91 and the electric power supply terminals 92 are electrically connected to a control unit of the recording apparatus 1000, ejection drive signals are supplied to the recording element boards 10 via the signal input terminals 91, and electric power necessary for the ejection is supplied to the recording element boards 10 via the electric power supply terminals 92.

Gathering wires in one place by using an electric circuit in the electric wiring board 90 can make the number of the signal input terminals 91 and the electric power supply terminals 92 smaller than the number of recording element boards 10. The number of electric connecting portions that need to be attached in attachment of the liquid ejection head 3 to the recording apparatus 1000 or removed in replacement of the liquid ejection head can be thereby reduced. As illustrated in FIG. 3B, the liquid connecting portions 111 provided in both end portions of the liquid ejection head 3 are connected to a liquid supply system of the recording apparatus 1000. The inks of four colors of CMYK are thereby supplied from the supply system of the recording apparatus 1000 to the liquid ejection head 3 and the inks having passed an interior of the liquid ejection head 3 are collected into the supply system of the recording apparatus 1000. The inks of the respective colors can be thus circulated via the paths of the recording apparatus 1000 and the paths of the liquid ejection head 3.

Figure 4:
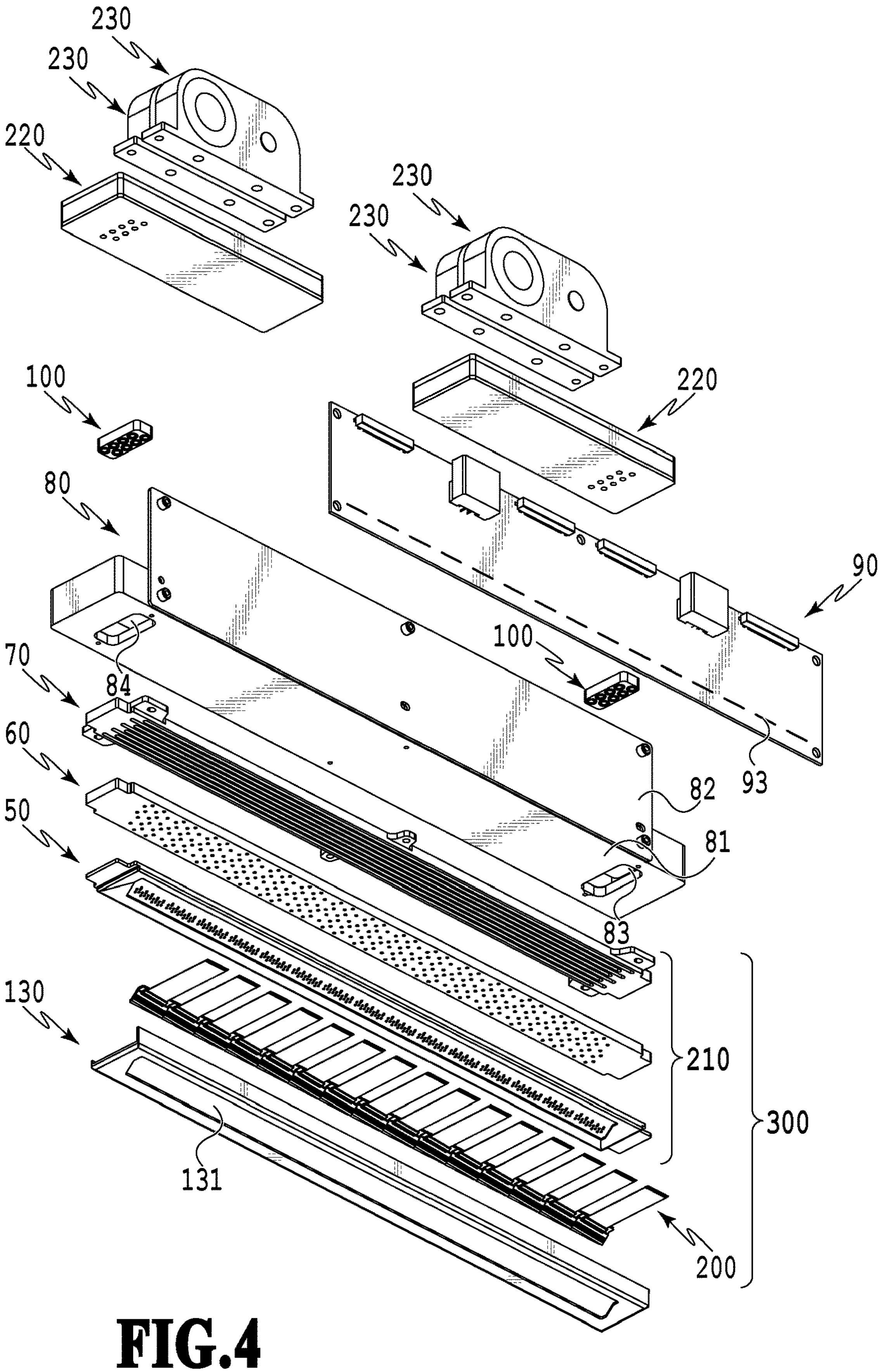
FIG. 4 is an exploded perspective view of the liquid ejection head 3 according to the first embodiment.

FIG. 4 illustrates an exploded perspective view of parts or units forming the liquid ejection head 3. The liquid ejection unit 300, the liquid supply units 220, and the electric wiring board 90 are attached to a case 80. The liquid supply units 220 are provided with the liquid connecting portions 111 (FIGS. 2A and 2B) and filters 221 (FIGS. 2A and 2B) for the respective colors that communicate with openings of the liquid connecting portions 111 are provided in the liquid supply units 220 to remove foreign objects in the supplied inks. The two liquid supply units 220 are each provided with the filters 221 respectively for two colors. The inks having passed the filters 221 are supplied to the negative pressure control units 230 corresponding to the respective colors and arranged on the liquid supply units 220.

The negative pressure control units 230 are units including pressure adjustment valves for the respective colors. Each of the negative pressure control units 230 greatly attenuates a pressure droplet change in the supply system (supply system upstream of the liquid ejection head 3) of the recording apparatus 1000 that occurs with fluctuation in the ink flow rate, by means of actions of valves, spring members, and the like provided in the negative pressure control unit 230. Accordingly, the negative pressure control units 230 can stabilize the negative pressure change downstream (on the liquid ejection unit 300 side) of the negative pressure control unit within a certain range. Two pressure adjustment valves for each color are incorporated in the negative pressure control unit 230 of each color as illustrated in FIG. 2A. Different control pressures are set for the respective pressure adjustment valves and the valve on the high pressure side and the valve on the low pressure side communicate with the common supply flow passage 211 and the common collection flow passage 212, respectively, in the liquid ejection unit 300 via the liquid supply unit 220.

The case 80 is formed of a liquid ejection unit supporting portion 81 and an electric wiring board supporting portion 82, supports the liquid ejection unit 300 and the electric wiring board 90, and secures the stiffness of the liquid ejection head 3. The electric wiring board supporting portion 82 is a portion for supporting the electric wiring board 90 and is fixed to the liquid ejection unit supporting portion 81 with screws. The liquid ejection unit supporting portion 81 has a role of correcting warping and deforming of the liquid ejection unit 300 and securing positional accuracy of the multiple recording element boards 10 relative to one another, and thereby suppresses stripes and unevenness in a recorded product. Accordingly, the liquid ejection unit supporting portion 81 preferably has sufficient stiffness and the material thereof is preferably a metal material such as SUS or aluminum or a ceramic such as alumina. Openings 83 and 84 in which joint rubbers 100 are inserted are provided in the liquid ejection unit supporting portion 81. The inks supplied from the liquid supply units 220 are guided to a third flow passage member 70 forming the liquid ejection unit 300 via the joint rubbers.

The liquid ejection unit 300 includes multiple ejection modules 200 and a flow passage member 210, and a cover member 130 is attached to a surface of the liquid ejection unit 300 on the recording medium side. In this example, as illustrated in FIG. 4, the cover member 130 is a member having a frame shaped surface provided with a long opening 131, and the recording element boards 10 and sealing members 110 (FIGS. 6A and 6B) included in the ejection modules 200 are exposed through the opening 131. A frame portion in a periphery of the opening 131 has a function of a contact surface with a cap member that caps the liquid ejection head 3 in the recording standby period. Accordingly, it is preferable to apply adhesive, a sealing material, a filler, or the like along the periphery of the opening 131 and fill unevenness and gaps on an ejection port surface of the liquid ejection unit 300 to form a closed space in a capped state.

Next, a configuration of the flow passage member 210 included in the liquid ejection unit 300 is described. As illustrated in FIG. 4, the flow passage member 210 is a member in which a first flow passage member 50, a second flow passage member 60, and the third flow passage member 70 are stacked one on top of another. The flow passage member 210 distributes the inks supplied from the liquid supply units 220 to the ejection modules 200 and returns the ink flowing back from the ejection modules 200 to the liquid supply units 220. The flow passage member 210 is fixed to the liquid ejection unit supporting portion 81 with screws and this suppresses warping and deforming of the flow passage member 210.

Figure 5A:
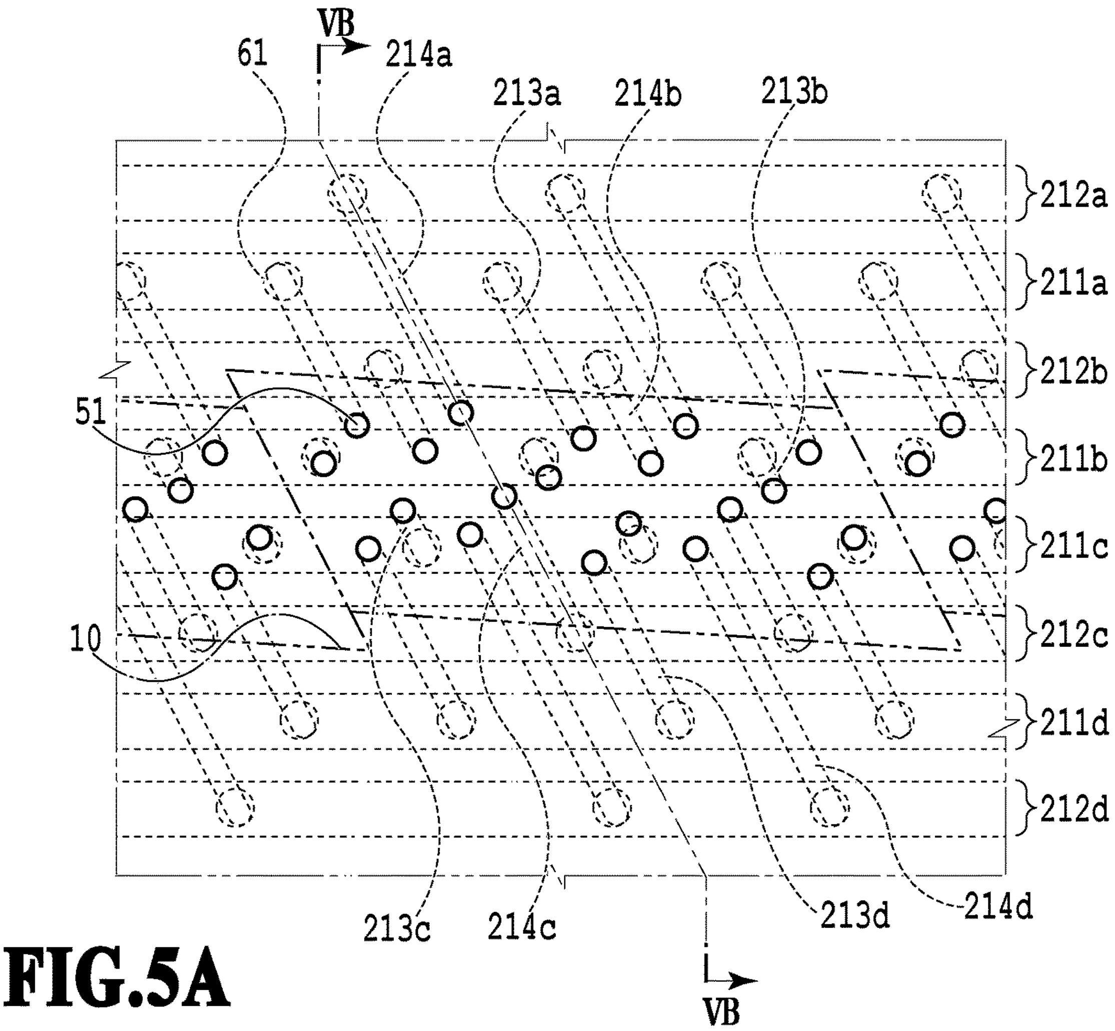
FIGS. 5A and 5B are views illustrating connection relationships of flow passages in the flow passage member 210.
Figure 5B:
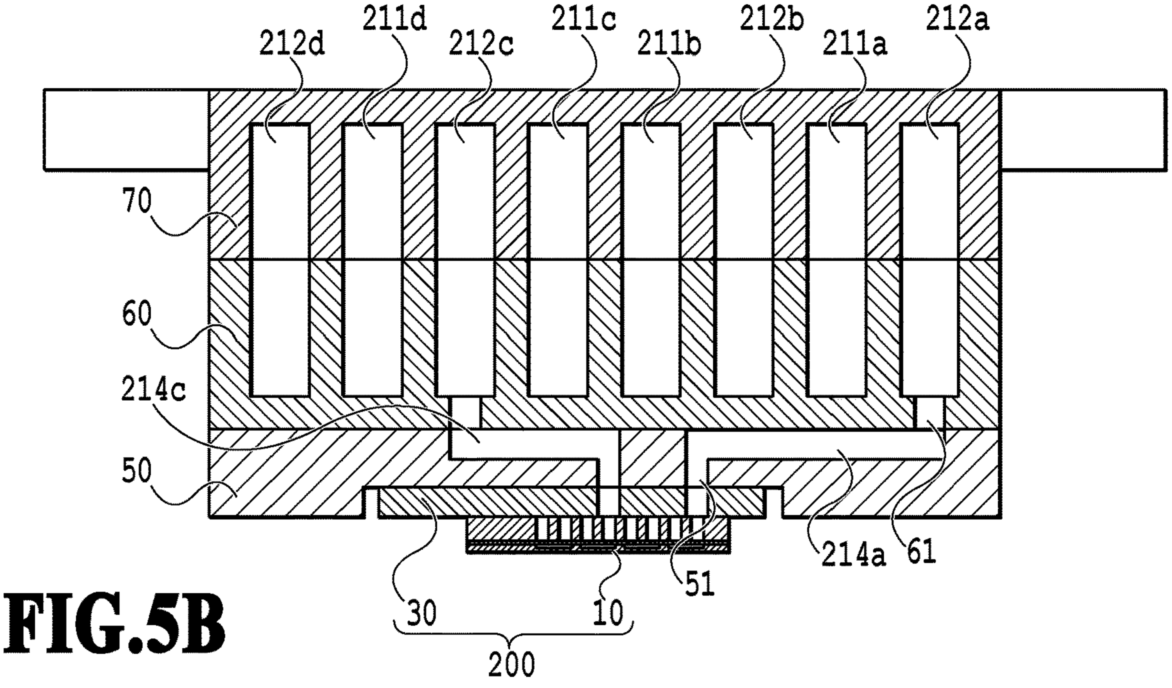

Next, connection relationships of the flow passages in the flow passage member 210 are described by using FIGS. 5A and 5B. FIG. 5A is a transparent view in which the flow passages in the flow passage member 210 formed by joining the first to third flow passage members are partially viewed in an enlarged manner from the side of the face of the first flow passage member 50 on which the ejection modules 200 are mounted. The flow passage member 210 is provided with the common supply flow passages 211 (211*a*, 211*b*, 211*c*, and 211*d*) for the respective colors and the common collection flow passages 212 (212*a*, 212*b*, 212*c*, and 212*d*) for the respective colors that extend in the longitudinal direction of the liquid ejection head 3. Multiple individual supply flow passages (213*a*, 213*b*, 213*c*, or 213*d*) formed by the individual flow passage grooves are connected to the common supply flow passage 211 for each color via the communication ports 61. Multiple individual collection flow passages (214*a*, 214*b*, 214*c*, or 214*d*) formed by the individual flow passage grooves are connected to the common collection flow passage 212 for each color via the communication ports 61. Such a flow passage configuration allows the inks to be gathered from the common supply flow passages 211 to the recording element boards 10 located in a center portion of the flow passage members via the individual supply flow passages 213. Moreover, the ink can be collected from the recording element boards 10 into the common collection flow passages 212 via the individual collection flow passages 214.

FIG. 5B is a view illustrating a cross section along the VB-VB line in FIG. 5A. As illustrated in FIG. 5B, each of the individual collection flow passages (214*a* and 214*c*) communicates with the ejection module 200 via the communication port 51. Although only the individual collection flow passages (214*a* and 214*c*) are illustrated in FIG. 5B, as illustrated in FIG. 5A, the individual supply flow passages 213 communicate with the ejection module 200 in another cross section. In a support member 30 and the recording element board 10 included in each ejection module 200, flow passages for supplying the inks from the first flow passage member 50 to recording elements 15 (FIG. 7A to 7C) provided in the recording element board 10 are formed. Moreover, in the support member 30 and the recording element board 10, flow passages for partially or entirely collecting (flowing-back) the inks supplied to the recording elements 15 into the first flow passage member 50 are formed. In this example, the common supply flow passage 211 for each color is connected to the negative pressure control unit 230 (high pressure side) for the corresponding color via the liquid supply unit 220 and the common collection flow passage 212 is connected to the negative pressure control unit 230 (low pressure side) via the liquid supply unit 220. The negative pressure control unit 230 generates a differential pressure (pressure difference) between the common supply flow passage 211 and the common collection flow passage 212. Accordingly, in the liquid ejection head of the present embodiment in which the flow passages are connected as illustrated in FIGS. 5A and 5B, a flow from the common supply flow passage 211 to the individual supply flow passages 213, to the recording element boards 10, to the individual collection flow passages 214, and to the common collection flow passage 212 is generated for each color.

<Ejection Module>

Figure 6A:
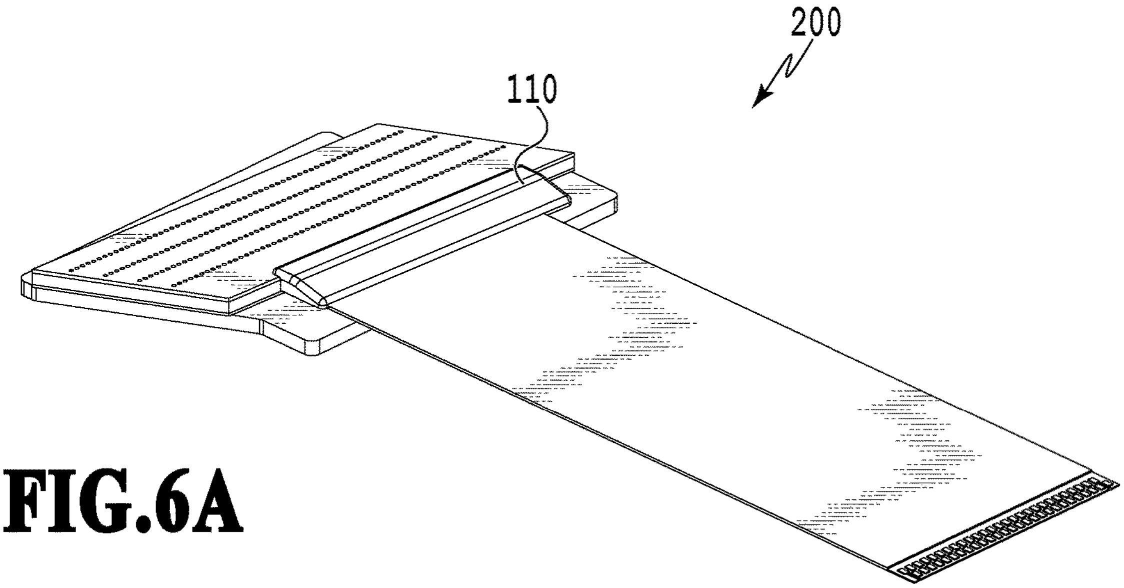
FIGS. 6A and 6B are views illustrating an ejection module 200.
Figure 6B:
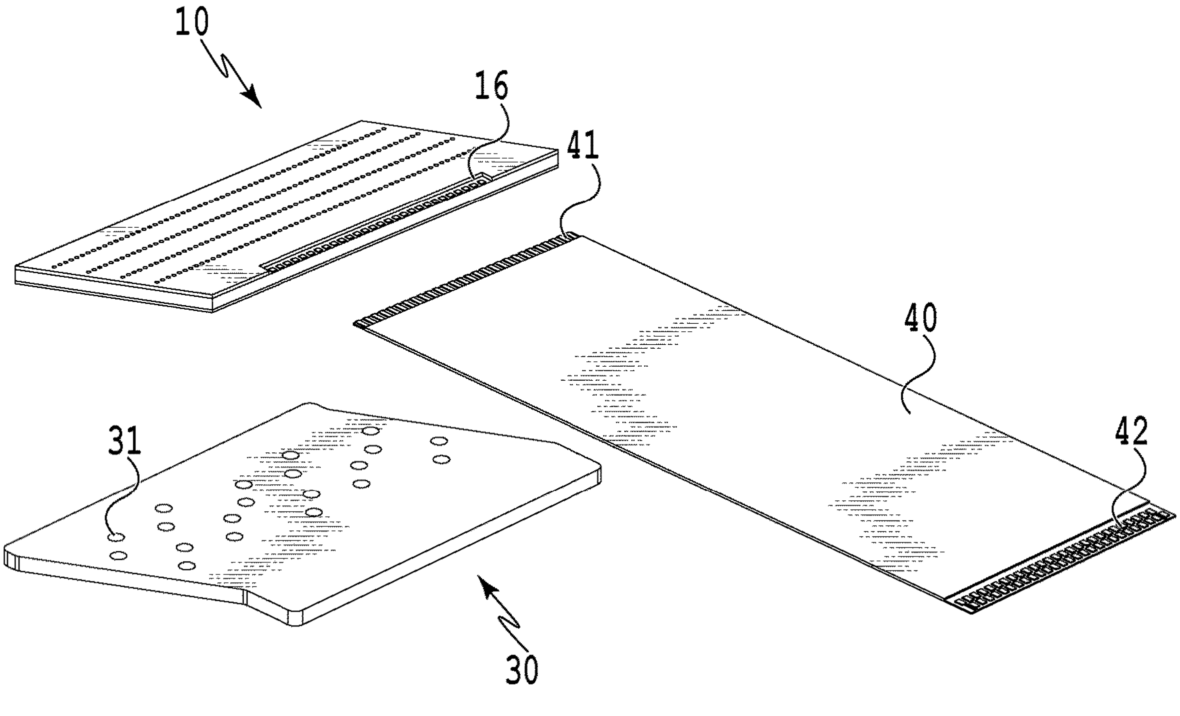

FIG. 6A illustrates a perspective view of one ejection module 200 and FIG. 6B illustrates an exploded view of this ejection module 200. As a method of manufacturing the ejection module 200, first, the recording element board 10 and the flexible wiring board 40 are bonded onto the support member 30 provided with liquid communication ports 31 in advance. Thereafter, a terminal 16 on the recording element board 10 and a terminal 41 on the flexible wiring board 40 are electrically connected to each other by wire bonding and then a wire-bonded portion (electric connecting portion) is covered with the sealing member 110 to be sealed. A terminal 42 of the flexible wiring boards 40 on the opposite side to the recording element board 10 is electrically connected to a connection terminal 93 (see FIG. 4) of the electric wiring board 90. Since the support member 30 is a support body that supports the recording element board 10 and is also a flow passage member that causes the recording element board 10 and the flow passage member 210 to fluidly communicate with each other, a member that has high flatness and that can be joined to the recording element board with sufficiently high reliability is preferable as the support member 30. The material of the support member 30 is preferably, for example, alumina or a resin material.

<Structure of Recording Element Board>

Figure 7A:
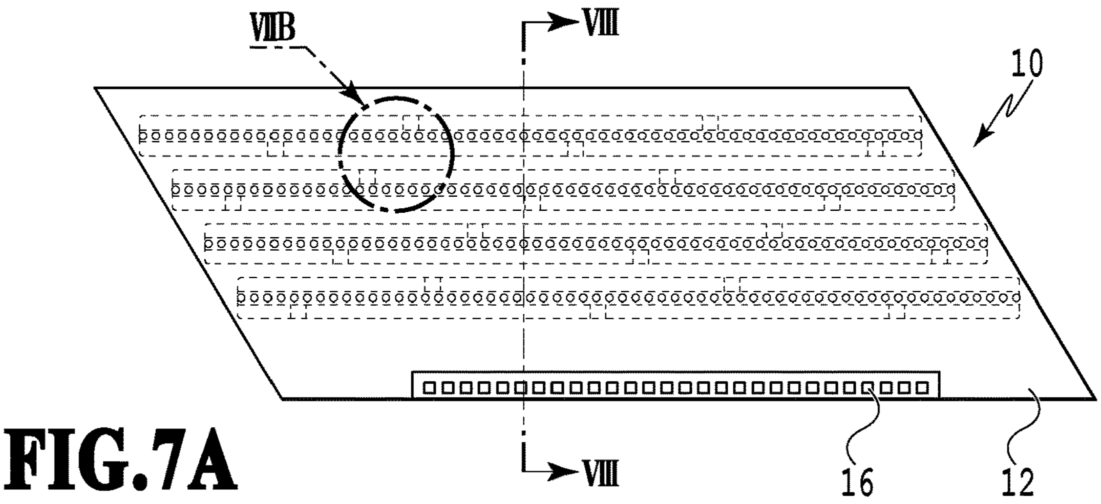
FIGS. 7A to 7C are views illustrating a structure of a recording element board 10.
Figure 7B:
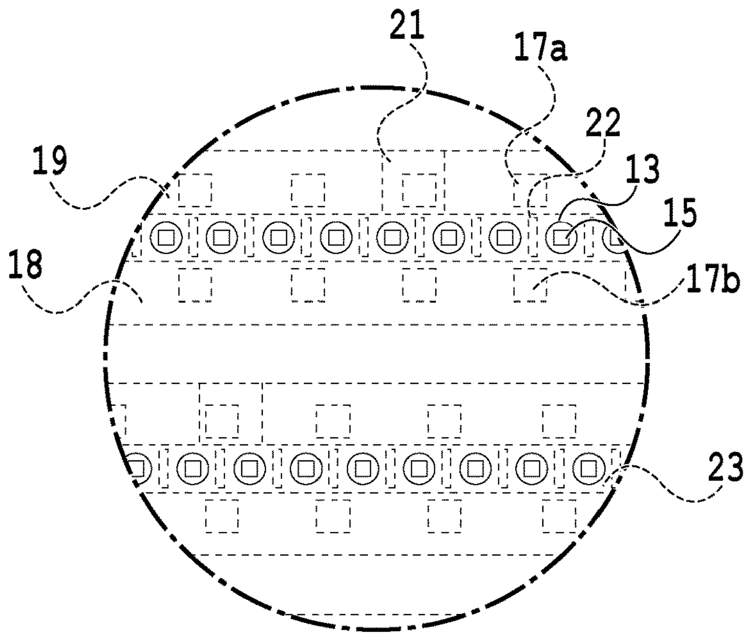
Figure 7C:
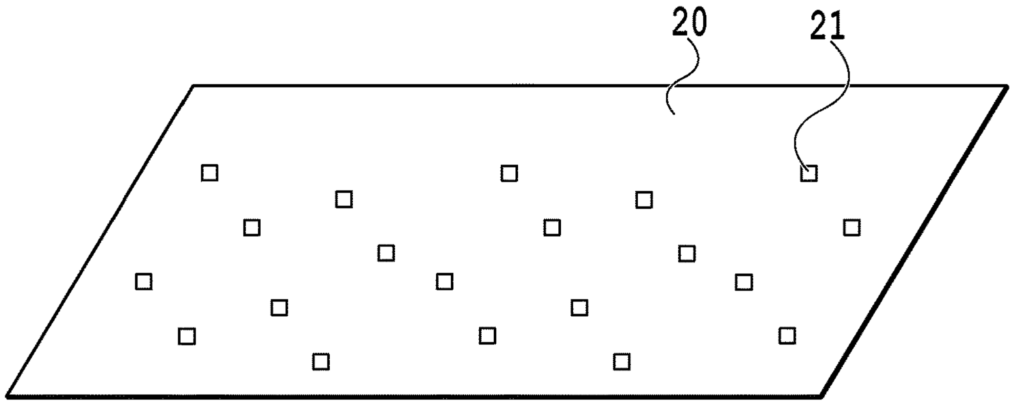
Figure 8:
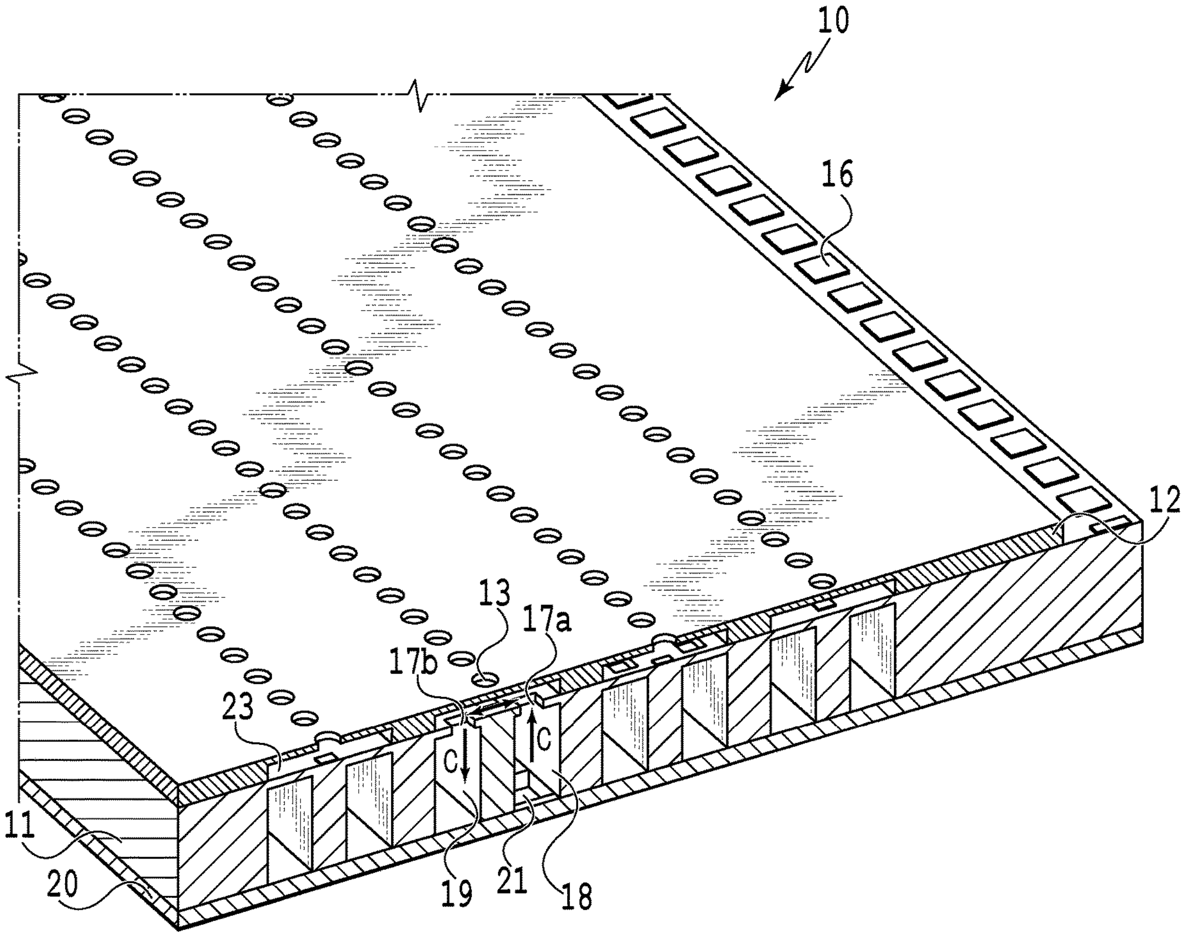
FIG. 8 is a perspective cross-sectional view illustrating a structure of the recording element board 10 along the cross-sectional line VIII-VIII in FIG. 7A.

A configuration of the recording element board 10 in the present embodiment is described. FIG. 7A illustrates a plan view of a face of the recording element board 10 on the side where ejection ports 13 are formed, FIG. 7B illustrates an enlarged view of a portion denoted by VIIb in FIG. 7A, and FIG. 7C illustrates a plan view of the back side of FIG. 7A. FIG. 8 is a perspective view illustrating cross sections of the recording element board 10 and a lid member 20 along the cross-sectional line VIII-VIII illustrated in FIG. 7A. As illustrated in FIG. 7A, four ejection port rows corresponding to the respective ink colors are formed in an ejection port forming member 12 of the recording element board 10. Note that an extending direction of the ejection port rows in which the multiple ejection ports 13 are aligned is hereinafter referred to as "ejection port row direction".

As illustrated in FIG. 7B, the recording elements 15 that are heating elements configured to generate bubbles in the inks by means of thermal energy are arranged at positions corresponding to the respective ejection ports 13. Pressure chambers 23 including the recording elements 15 therein are sectioned by partitions 22. The recording elements 15 are electrically connected to the terminal 16 in FIG. 7A by electrical wiring (not illustrated) provided in the recording element board 10. The recording elements 15 generate heat and cause the inks to boil based on pulse signals received from a control circuit of the recording apparatus 1000 via the electric wiring board 90 (FIG. 4) and the flexible wiring board 40 (FIGS. 6A and 6B). Force of bubbles generated by this boiling ejects the inks from the ejection ports 13. As illustrated in FIG. 7B, a liquid supply passage 18 extends along each ejection port row on one side thereof and a liquid collection passage 19 extends along the ejection port row on the other side thereof. The liquid supply passage 18 and the liquid collection passage 19 are flow passages provided in the recording element board 10 and extending in the ejection port row direction and communicate with each ejection port 13 via a supply port 17*a* and a collection port 17*b*, respectively.

As illustrated in FIGS. 7C and 8, the sheet-shaped lid member 20 is stacked on the back side of the face of the recording element board 10 on which the ejection ports 13 are formed, and multiple openings 21 that are described later and that communicate with the liquid supply passage 18 and the liquid collection passage 19 are provided in the lid member 20. In the present embodiment, three openings 21 are provided for one liquid supply passage 18 and two openings 21 are provided for one liquid collection passage 19 in the lid member 20. As illustrated in FIG. 7B, the openings 21 in the lid member 20 communicate with the multiple communication ports 51 illustrated in FIG. 5A and the like, respectively. As illustrated in FIG. 8, the lid member 20 has a function of a lid that forms part of walls of the liquid supply passage 18 and the liquid collection passage 19 formed in a substrate 11 of the recording element board 10. The lid member 20 is preferably an object that has sufficient corrosion resistance to the inks, and high accuracy is required for the opening shape and opening positions of the openings 21 from the viewpoint of preventing color mixing. Accordingly, it is preferable that a photosensitive resin material and a silicon plate are used as the material of the lid member 20 and the openings 21 are provided by a photolithography process. As described above, the lid member is a member that converts the pitch of the flow passages by using the openings 21, preferably has a small thickness considering pressure droplet, and is desirably formed of a film-shaped member.

Next, flow of the inks in the recording element board 10 is described. FIG. 8 is a perspective view illustrating the cross sections of the recording element board 10 and the lid member 20 along the cross-sectional line VIII-VIII in FIG. 7A. In the recording element board 10, the substrate 11 made of Si and the ejection port forming member 12 made of a photosensitive resin are stacked one on top of the other and the lid member 20 is joined to the back face of the substrate 11. The recording elements 15 are formed on one face of the substrate 11 (FIGS. 7A to 7C) and grooves forming the liquid supply passage 18 and the liquid collection passage 19 extending along each ejection port row are formed on the back face of the substrate 11. The liquid supply passage 18 and the liquid collection passage 19 formed by the substrate 11 and the lid member 20 are connected respectively to the common supply flow passage 211 and the common collection flow passage 212 in the flow passage member 210 and a differential pressure is generated between the liquid supply passage 18 and the liquid collection passage 19. In the ejection ports that are not preforming the ejection operation while the ink is ejected from the multiple ejection ports 13 of the liquid ejection head 3 to perform recording, flow of the ink in the liquid supply passage 18 provided in the substrate 11 is flow illustrated by the arrows C in FIG. 8 due to this differential pressure. Specifically, the ink flows to the liquid collection passage 19 via the supply port 17*a*, the pressure chamber 23, and the collection port 17*b*. This flow allows bubbles, foreign objects, viscosity-increased ink generated by evaporation from the ejection ports 13, and the like to be collected into the liquid collection passage 19, in the ejection ports 13 and the pressure chambers 23 in which recording is paused. Moreover, it is possible to suppress an increase in the viscosity of the ink in the ejection ports 13 and the pressure chambers 23. The ink collected into the liquid collection passage 19 passes through the openings 21 of the lid member 20 and the liquid communication ports 31 (see FIG. 6B) of the support member 30 and is collected into the communication ports 51 in the flow passage member 210, the individual collection flow passages 214, and the common collection flow passage 212 in this order. The ink is eventually collected into a supply path of the recording apparatus 1000.

Specifically, the ink supplied from the recording apparatus main body to the liquid ejection head 3 flows in the following order to be supplied and collected. The ink first flows into an interior of the liquid ejection head 3 from the liquid connecting portion 111 of the liquid supply unit 220. Then, the ink is supplied to the joint rubber 100, to the communication port and the common flow passage groove provided in the third flow passage member, to the common flow passage groove and the communication port 61 provided in the second flow passage member, and to the individual flow passage groove and the communication port 51 provided in the first flow passage member in this order. Then, the ink is supplied to each pressure chamber 23 via the liquid communication port 31 provided in the support member 30, the opening 21 provided in the lid member, the liquid supply passage 18 provided in the substrate 11, and the supply port 17*a* in this order. The ink supplied to the pressure chamber 23 and not ejected from the ejection port 13 flows through the collection port 17*b* and the liquid collection passage 19 provided in the substrate 11, the opening 21 provided in the lid member, and the liquid communication port 31 provided in the support member 30 in this order. Then, the ink flows through the communication port 51 and the individual flow passage groove provided in the first flow passage member, the communication port 61 and the common flow passage groove provided in the second flow passage member, the common flow passage groove and the communication port provided in the third flow passage member 70, and the joint rubber 100 in this order. Furthermore, the ink flows to the outside of the liquid ejection head 3 from the liquid connecting portion 111 provided in the liquid supply unit. In the mode of the first circulation path illustrated in FIG. 2A, the ink flowing in from the liquid connecting portion 111 passes the negative pressure control unit 230 and is then supplied to the joint rubber 100. In the mode of the second circulation path illustrated in FIG. 2B, the ink collected from the pressure chamber 23 passes the joint rubber 100, then passes the negative pressure control unit 230, and flows to the outside the liquid ejection head from the liquid connecting portion 111.

Moreover, as illustrated in FIGS. 2A and 2B, not all of the ink flowing in from the one end of the common supply flow passage 211 of the liquid ejection unit 300 is supplied to the pressure chambers 23 via the individual supply flow passages 213*a*. There is a portion of the ink that flows from the other end of the common supply flow passage 211 to the liquid supply unit 220 without flowing into the individual supply flow passages 213*a*. Providing a path through which the ink flows without passing the recording element boards 10 as described above can suppress backward-flow of the ink circulation flow even in the case where the recording element boards 10 including fine flow passages with large flow resistance are provided as in the present embodiment. As described above, since the liquid ejection head of the present embodiment can suppress an increase in the viscosity of the ink in portions near the pressure chambers and the ejection ports, it is possible to suppress non-ejection and deviation of an ejection direction from a normal direction and, as a result, perform high-quality recording.

<Positional Relationships between Adjacent Recording Element Boards>

Figure 9:
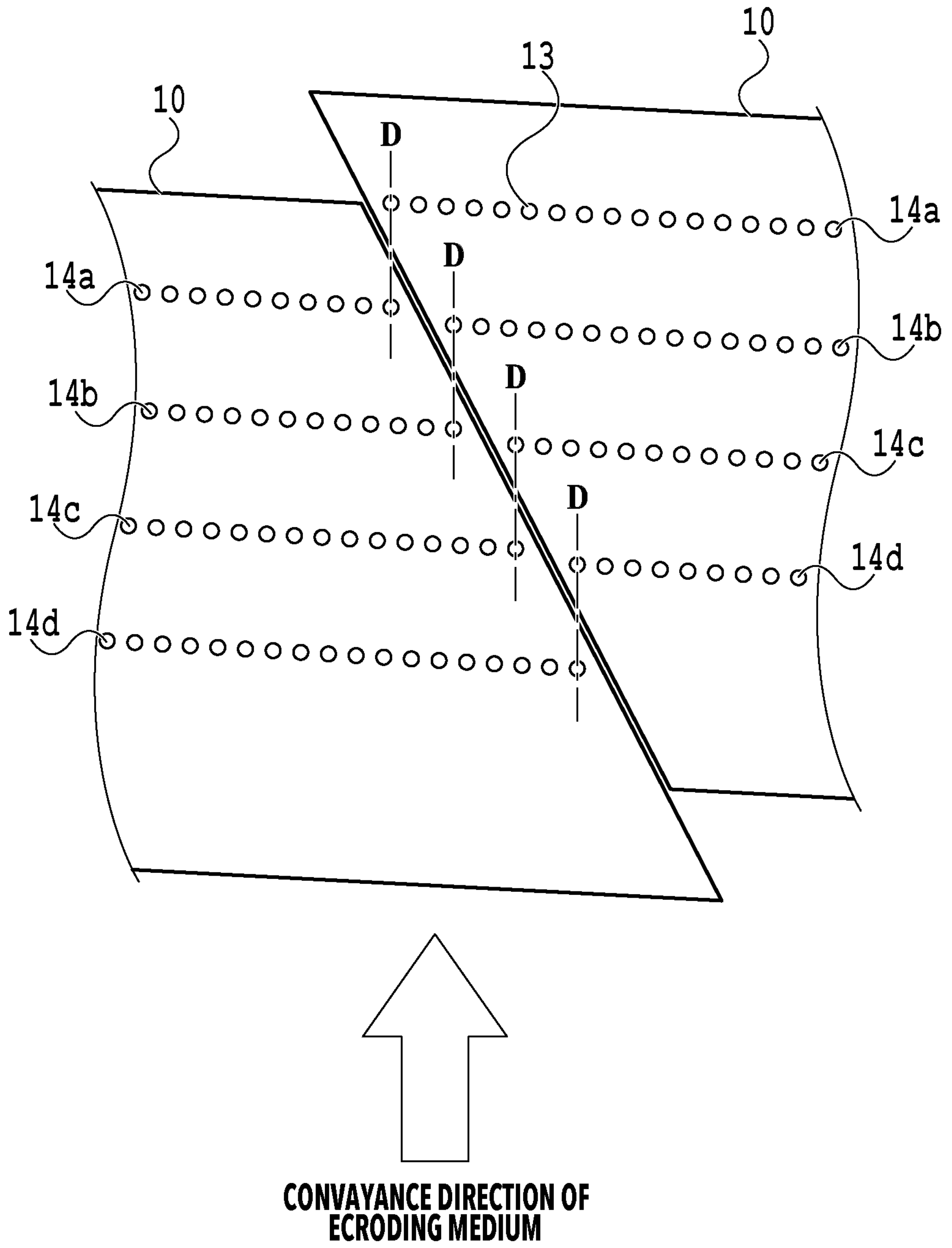
FIG. 9 is a plan view illustrating adjacent portions of the recording element boards 10 in a partially enlarged manner.

FIG. 9 is a plan view illustrating adjacent portions of the recording element boards in two adjacent ejection modules in a partially enlarged manner. As illustrated in FIG. 7A and the like, in the present embodiment, recording element boards with a substantially parallelogram shape are used in the present embodiment. As illustrated in FIG. 9, in each recording element board 10, the ejection port rows (14*a* to 14*d*) in which the ejection ports 13 are aligned are arranged to be tilted at a certain angle with respect to the conveyance direction of the recording medium. In the ejection port rows in the adjacent portions of the respective recording element boards 10, at least two ejection ports thereby overlap each other in the conveyance direction of the recording medium. In FIG. 9, two ejection ports on each of D lines are in an overlapping relationship. Even in the case where the position of the recording element board 10 is misaligned from a predetermined position by a certain degree, this arrangement can make black stripes and blank areas in a recorded image less noticeable by performing drive control of the overlapping ejection ports. The configuration as in FIG. 9 can be achieved also in the case where the multiple recording element boards 10 are arranged on a straight line (in line) instead of a zigzag pattern. This can provide measures against black stripes and blank areas in overlap portions of the recording element boards 10 while suppressing an increase in the length of the liquid ejection head in the conveyance direction of the recording medium. Although the main flat surface of each recording element board has the parallelogram shape in this example, the present embodiment is not limited to this and the configuration of the present embodiment can be preferably applied also to the case where a recording element board with, for example, a rectangular shape, a trapezoidal shape, or any other shape is used.

Second Embodiment

Configurations of the inkjet recording apparatus 1000 and the liquid ejection head 3 according to a second embodiment are described below. Note that, in the following description, portions different from the first embodiment are mainly described and description of the same portions as those in the first embodiment are omitted as appropriate.

<Inkjet Recording Apparatus>

Figure 10:
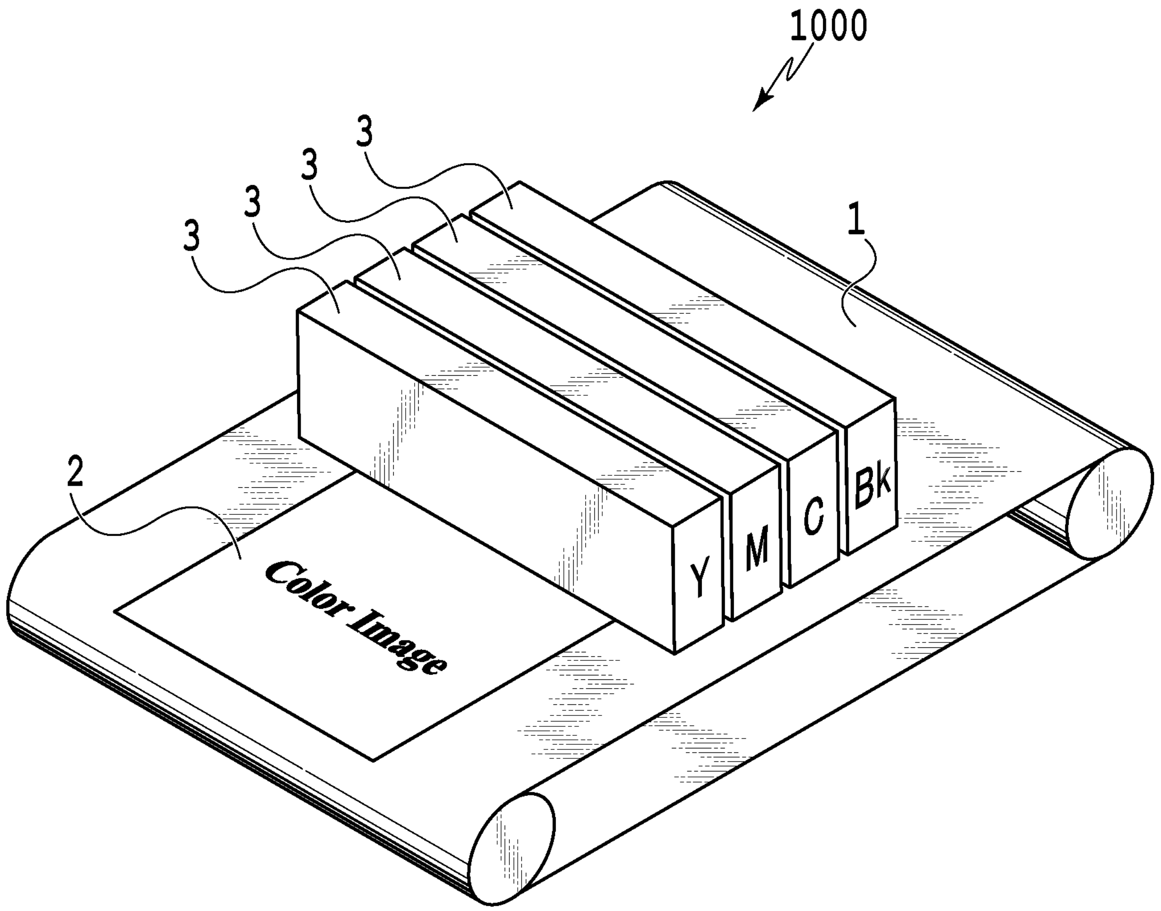
FIG. 10 is a view illustrating a schematic configuration of the recording apparatus 1000 according to a second embodiment.

FIG. 10 illustrates a schematic configuration of an inkjet recording apparatus 1000 according to the present embodiment. As illustrated in FIG. 10, the recording apparatus 1000 of the present embodiment is different from that of the first embodiment in that four single-color liquid ejection heads 3 corresponding to the respective inks of CMYK are arranged parallel to one another to perform full-color recording on a recording medium 2. In the first embodiment, the number of ejection port rows usable for one color is one. Meanwhile, in the present embodiment, the number of ejection port rows usable for one color is 20 (see FIGS. 16A to 16C). Accordingly, performing recording while appropriately allotting recording data to multiple ejection port rows enables recording at very high speed. Moreover, even in the case where there is an ejection port that does not eject the ink, an ejection port in another row that is at a position corresponding the not-ejecting ejection port in the conveyance direction of the recording medium complementally performs ejection and this improves reliability. Accordingly, this configuration is preferable for commercial printing and the like. In the recording apparatus 1000 according to the present embodiment, as in the first embodiment, the supply system of the recording apparatus 1000, the buffer tank 1003, and the main tank 1006 are fluidly connected to each liquid ejection head 3 (see FIGS. 2A and 2B). Moreover, an electric control unit that sends electric power and ejection control signals to each liquid ejection head 3 is electrically connected to the liquid ejection head 3.

<Circulation Path>

As in the first embodiment, the first circulation path (FIG. 2A) or the second circulation path (FIG. 2B) can be used as a liquid circulation path that connects each liquid ejection head 3 and the recording apparatus 1000 according to the present embodiment to each other.

<Configuration of Liquid Ejection Head>

Figure 11A:
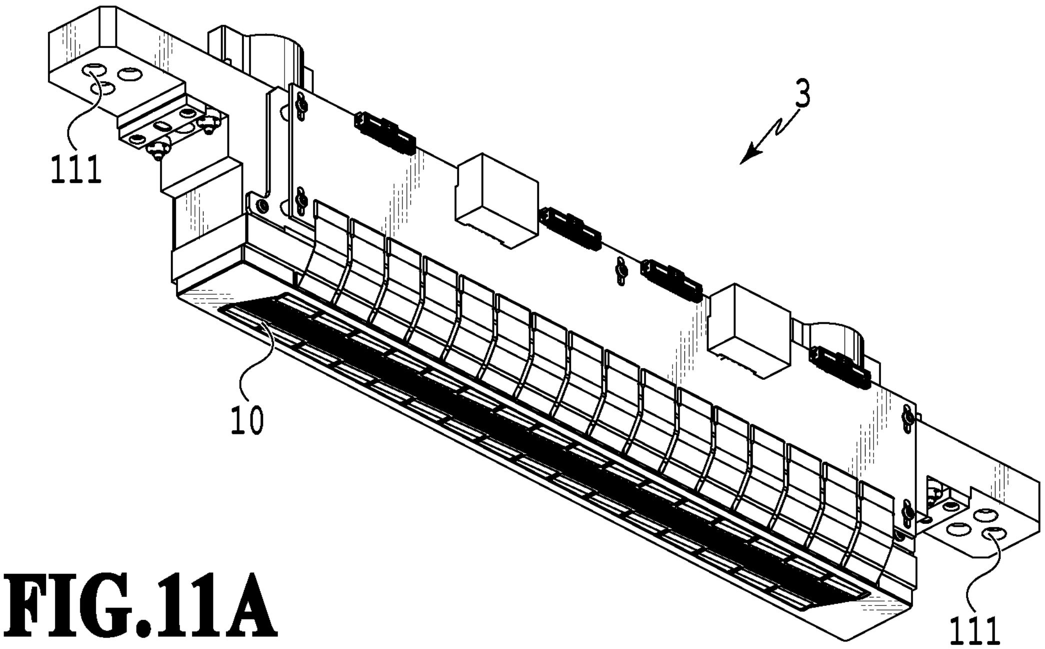
FIGS. 11A and 11B are perspective views of the liquid ejection head 3 according to the second embodiment.
Figure 11B:
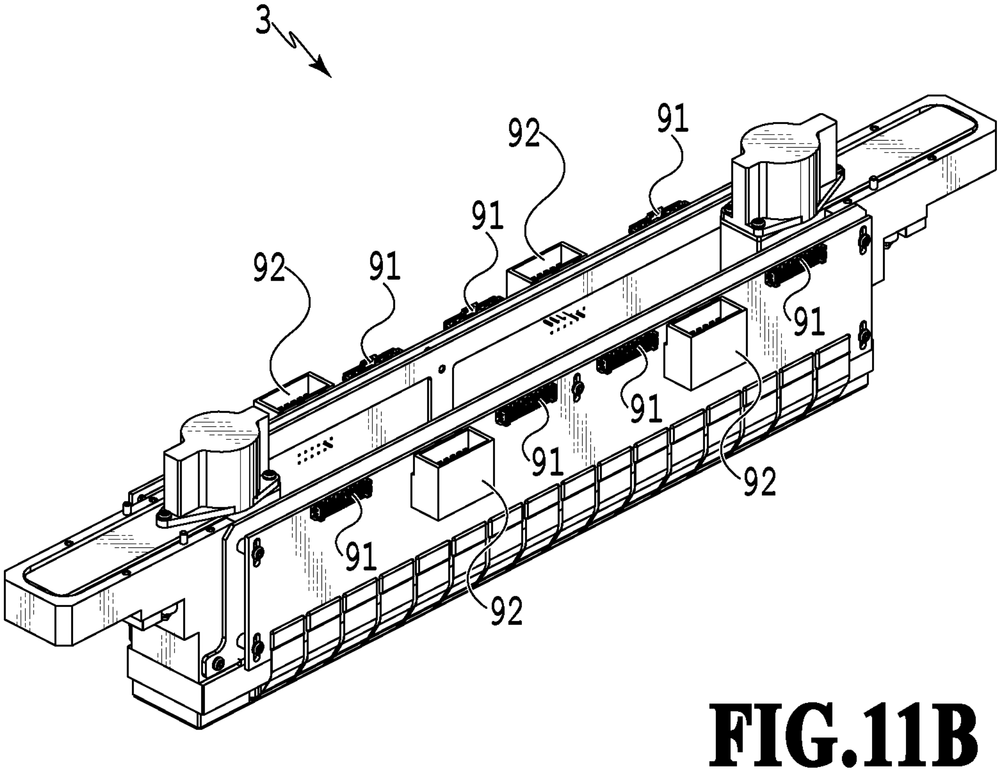

A configuration of each liquid ejection head 3 according to the present embodiment is described below. FIGS. 11A and 11B are perspective views of the liquid ejection head 3 according to the present embodiment. As illustrated in FIG. 11A, the liquid ejection head 3 includes 16 recording element boards 10 aligned in a straight line in a longitudinal direction of the liquid ejection head 3 and is a line type inkjet recording head capable of preforming recording by using an ink of one color. Moreover, as illustrated in FIGS. 11A and 11B, as in the first embodiment, the liquid ejection head 3 includes the liquid connecting portions 111, the signal input terminals 91, and the electric power supply terminals 92. However, since the liquid ejection head 3 of the present embodiment has more ejection port rows than that of the first embodiment, the signal input terminals 91 and the electric power supply terminals 92 are arranged on both sides of the liquid ejection head 3. This is to reduce voltage drop and signal transmission delay caused in wiring units provided in the recording element boards 10.

Figure 12:
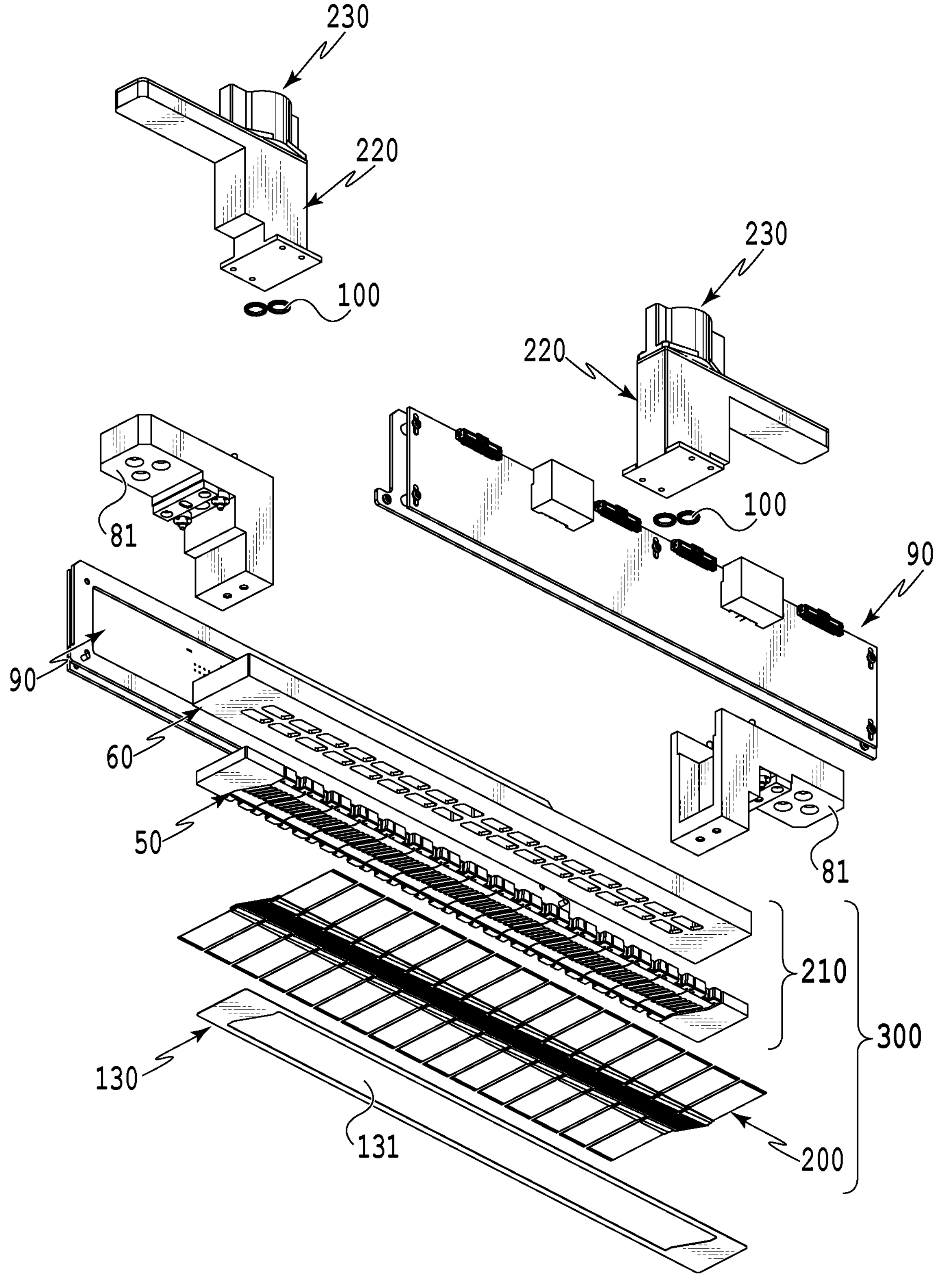
FIG. 12 is an exploded perspective view of the liquid ejection head 3 according to the second embodiment.

FIG. 12 is an exploded perspective view of the liquid ejection head 3 according to the present embodiment and illustrates parts and units forming the liquid ejection head 3 in a manner divided depending on functions thereof. Although roles of the respective units and members and the order of liquid flow in the liquid ejection head are basically the same as those in the first embodiment, a function of securing the stiffness of the liquid ejection head is different from that in the first embodiment. Specifically, the liquid ejection unit supporting portion 81 mainly secures the stiffness of the liquid ejection head in the first embodiment while the second flow passage member 60 included in the liquid ejection unit 300 secures the stiffness of the liquid ejection head in the liquid ejection head of the present embodiment. The liquid ejection unit supporting portion 81 according to the present embodiment is connected to both end portions of the second flow passage member 60 and the liquid ejection unit 300 is mechanically coupled to a carriage of the recording apparatus 1000 to align the liquid ejection head 3. The electric wiring board 90 and the liquid supply units 220 including the negative pressure control units 230 are coupled to the liquid ejection unit supporting portion 81. A filter (not illustrated) is incorporated in each of the two liquid supply units 220. The two negative pressure control units 230 are set to control pressure to relatively high negative pressure and relatively low negative pressure different from each other, respectively. Moreover, in the case where the high pressure side negative pressure control unit 230 is arranged in one end portion of the liquid ejection head 3 and the low pressure side negative pressure control unit 230 is arranged in the other end portion as illustrated in FIG. 12, an ink flow in the common supply flow passage 211 extending in the longitudinal direction of the liquid ejection head 3 and an ink flow in the common collection flow passage 212 extending in the longitudinal direction of the liquid ejection head 3 are in an opposite relationship. This promotes heat exchange between the common supply flow passage 211 and the common collection flow passage 212 and a temperature difference in the two common flow passages is reduced. Accordingly, a temperature difference among the multiple recording element boards 10 provided along the common flow passages is less likely to occur and there is an advantage that recording unevenness due to the temperature difference is less likely to occur.

Next, details of the flow passage member 210 included in the liquid ejection unit 300 are described. As illustrated in FIG. 12, the flow passage member 210 is a member in which the first flow passage member 50 and the second flow passage member 60 are stacked one on top of the other, and distributes the ink supplied from the liquid supply units 220 to the ejection modules 200. Moreover, the flow passage member 210 functions as a flow passage member for returning the ink flowing back from the ejection modules 200 to the liquid supply units 220. The second flow passage member 60 is a flow passage member in which the common supply flow passage 211 and the common collection flow passage 212 are formed and has a function of mainly securing the stiffness of the liquid ejection head 3. Accordingly, the material of the second flow passage member 60 is preferably a material that has high mechanical strength and sufficient corrosion resistance against the ink. Specifically, SUS, Ti, alumina, and the like can be preferably used.

Figure 13A:
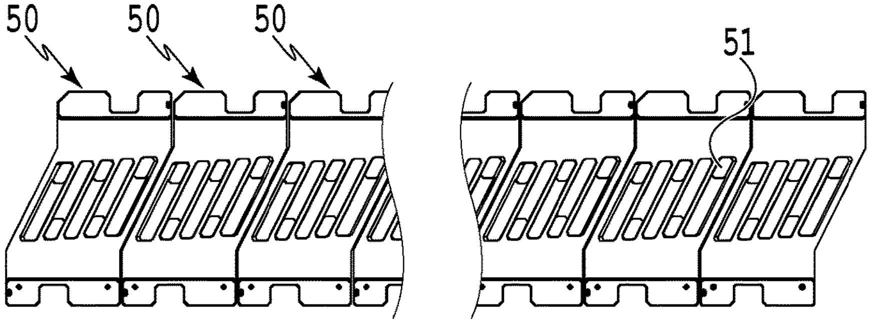
FIGS. 13A to 13E are views illustrating a configuration of a flow passage member 210 included in the liquid ejection head 3 according to the second embodiment.
Figure 13B:
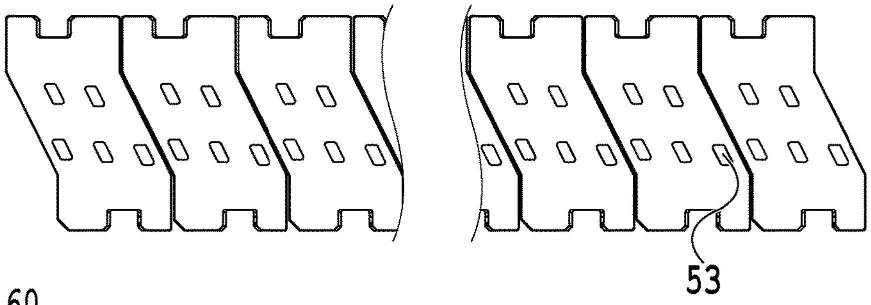
Figure 13C:
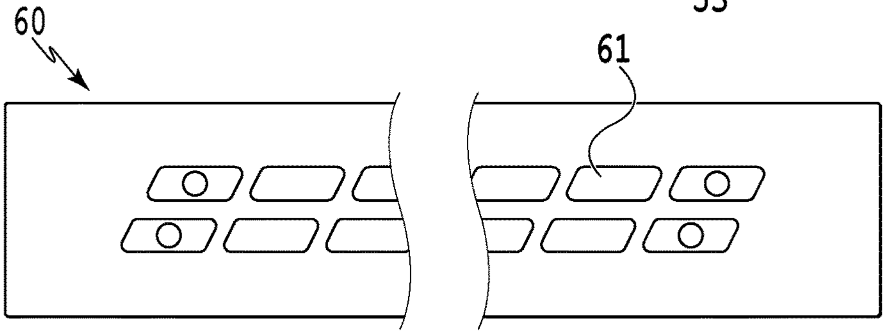
Figure 13D:
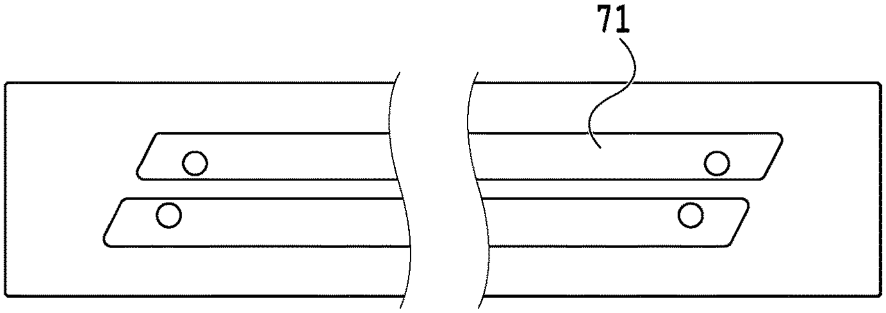
Figure 13E:
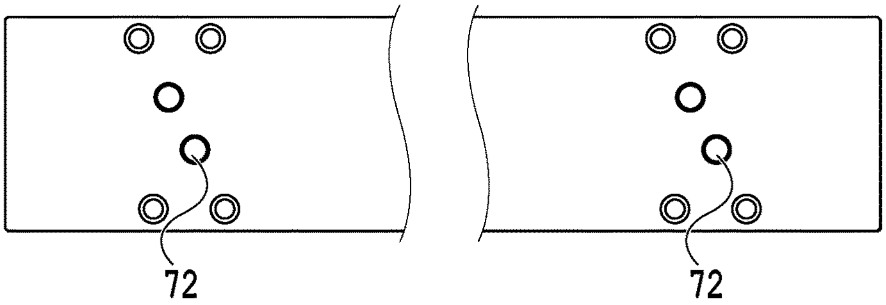

FIG. 13A illustrates a face of the first flow passage member 50 on the side where the ejection modules 200 are mounted and FIG. 13B illustrates a face that is the back face of the face of FIG. 13A and that is on the side coming into contact with the second flow passage member 60. Unlike the first embodiment, the first flow passage member 50 according to the present embodiment is a member in which multiple members corresponding to the respective ejection modules 200 are aligned adjacent to one another. Since the divided structure as described above can handle any length of the liquid ejection head by arranging multiple modules, the structure can be preferably applied to, for example, a relatively long scale liquid ejection head for a B2 size or larger. As illustrated in FIG. 13A, the communication ports 51 of the first flow passage member 50 fluidly communicate with the ejection modules 200 and, as illustrated in FIG. 13B, individual communication ports 53 of the first flow passage member 50 fluidly communicate with the communication ports 61 of the second flow passage member 60. FIG. 13C illustrates a face of the second flow passage member 60 on the side coming into contact with the first flow passage member 50, FIG. 13D illustrates a cross section of a center portion of the second flow passage member 60 in the thickness direction, and FIG. 13E is a view illustrating a face of the second flow passage member 60 on the side coming into contact with the liquid supply units 220. Functions of the flow passages and the communication ports of the second flow passage member 60 are the same as those in the ink supply system for one color in the first embodiment. One of the common flow passage grooves 71 of the second flow passage member 60 is the common supply flow passage 211 illustrated in FIGS. 14A and 14B and the other is the common collection flow passage 212. The ink is supplied to each common flow passage groove 71 from one end side to the other end side along the longitudinal direction of the liquid ejection head 3.

Figure 14A:
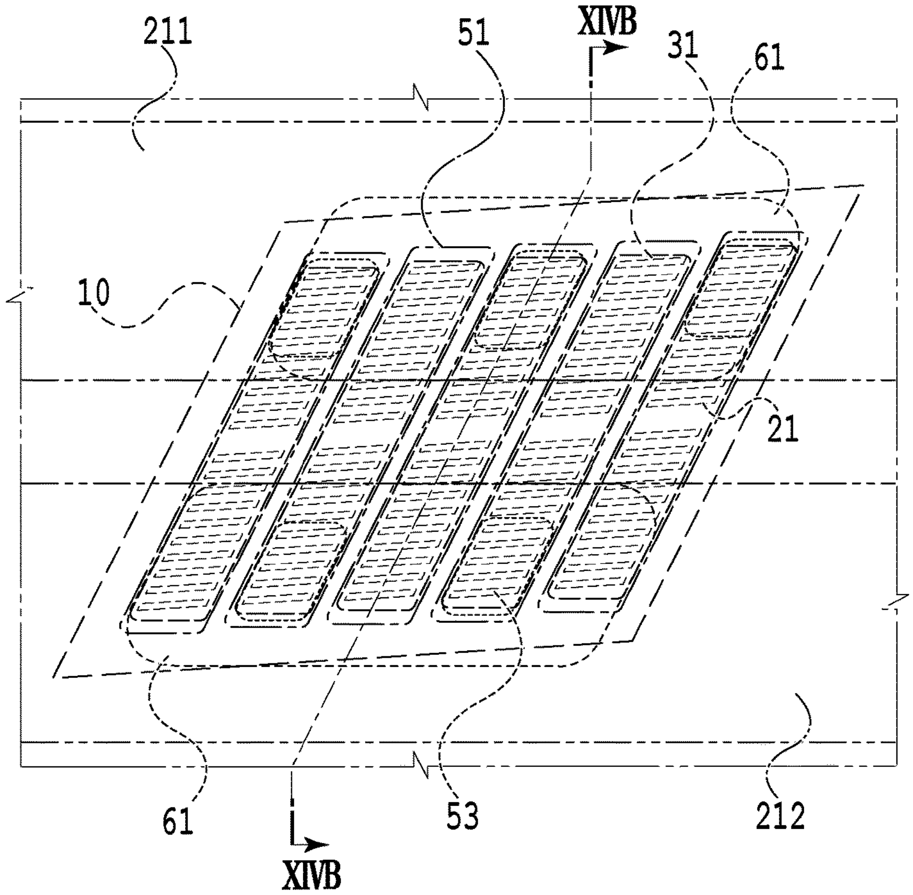
FIGS. 14A and 14B are views for explaining connection relationships of flow passages in the recording element board 10 and the flow passage member 210.

FIG. 14A is a see-through view illustrating connection relationships of ink flow passages in the recording element boards 10 and the flow passage member 210. As illustrated in FIG. 14A, one set of the common supply flow passage 211 and the common collection flow passage 212 extending in the longitudinal direction of the liquid ejection head 3 is provided in the flow passage member 210. The communication ports 61 of the second flow passage member 60 are aligned and connected to the individual communication ports 53 of the first flow passage member 50, and liquid supply paths that communicatively extend from the communication ports 72 of the second flow passage member 60 to the communication ports 51 of the first flow passage member 50 via the common supply flow passage 211 are formed. Similarly, liquid collection paths that communicatively extend from the communication ports of the second flow passage member 60 to the communication ports 51 of the first flow passage member 50 via the common collection flow passage 212 are also formed.

Figure 14B:
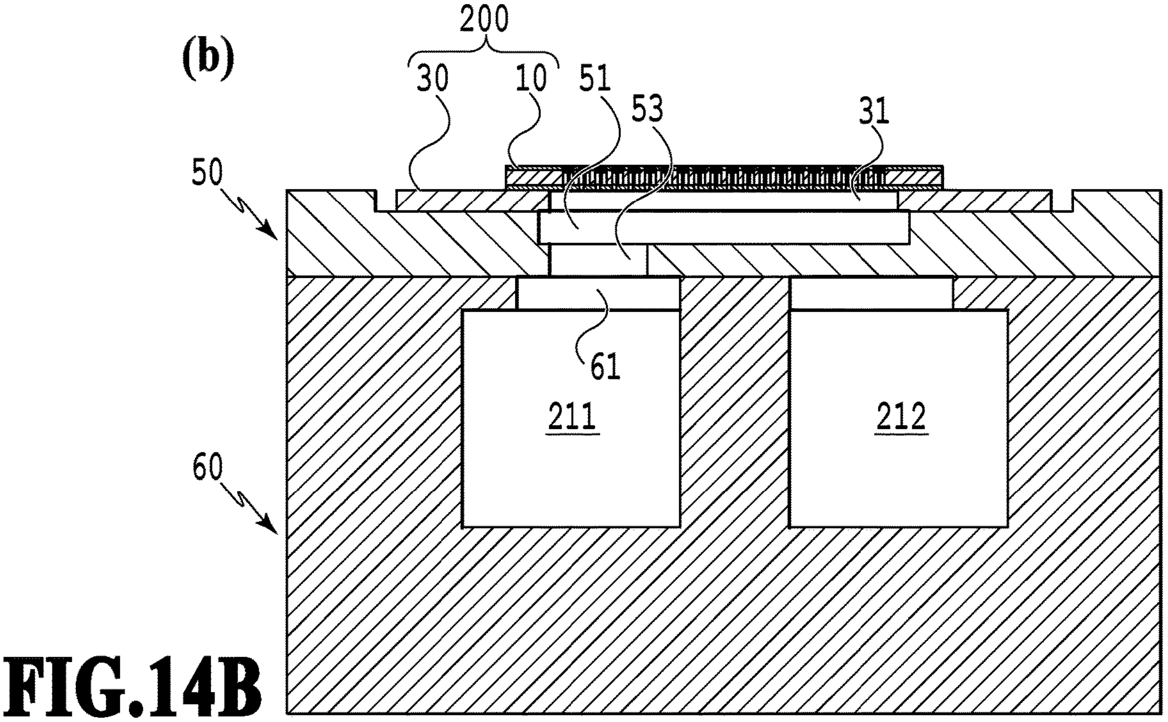

FIG. 14B is a view illustrating a cross section along the XIVB-XIVB line in FIG. 14A. As illustrated in FIG. 14B, the common supply flow passage is connected to the ejection modules 200 via the communication ports 61, the individual communication ports 53, and the communication ports 51. Although not illustrated in FIG. 14B, with reference to FIG. 14A, it is apparent that the individual collection flow passages are connected to the ejection modules 200 in similar paths on another cross section. As in the first embodiment, flow passages communicating with the respective ejection ports 13 are formed in each ejection module 200 and each recording element board 10 and the supplied ink can partially or entirely flow back while passing the ejection ports 13 (pressure chambers 23) in which the ejection operation is paused. Moreover, as in the first embodiment, the common supply flow passage 211 and the common collection flow passage 212 are connected to the negative pressure control units 230 (high pressure side) and the negative pressure control units 230 (low pressure side), respectively, via the liquid supply units 220. Accordingly, this differential pressure generates a flow that flows from the common supply flow passage 211 to the common collection flow passage 212 while passing the ejection ports 13 (pressure chambers 23) of the recording element boards 10.

<Ejection Module>

Figure 15A:
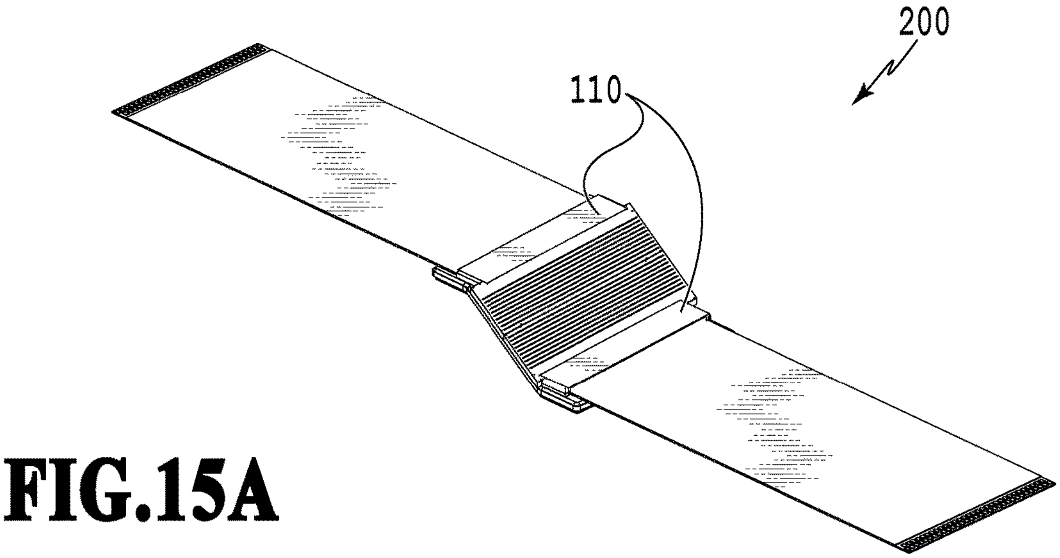
FIGS. 15A and 15B are views illustrating the ejection module 200.
Figure 15B:
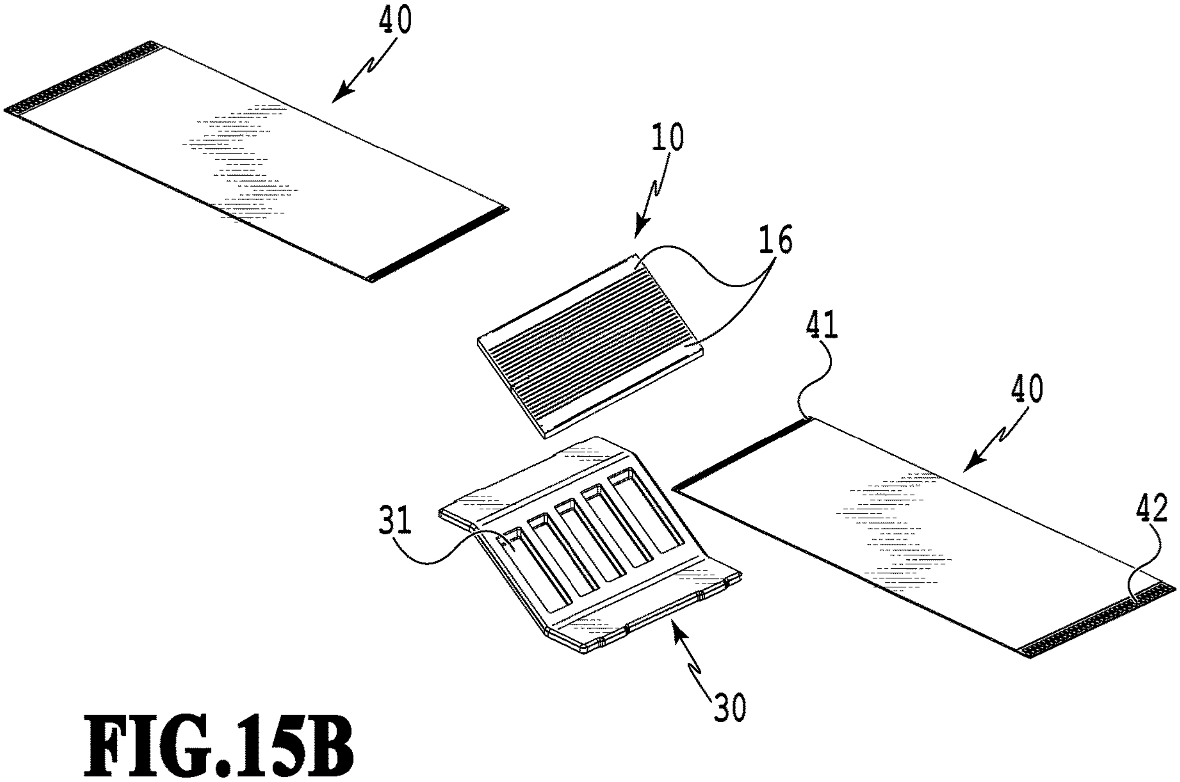

FIG. 15A is a perspective view of one ejection module 200 and FIG. 15B illustrates an exploded view of this ejection module 200. The present embodiment is different from the first embodiment in that multiple terminals 16 are arranged in each of outer end portions of the recording element board 10 in a direction in which the multiple ejection port rows are aligned (in each of long-side portions of the recording element board 10). Moreover, as another difference, two flexible wiring boards 40 electrically connected to the terminals 16 are arranged for one recording element board 10. This is because the number of ejection port rows provided in the recording element board 10 is 20 and is far greater than 8 in the first embodiment. Specifically, an object of this configuration is to suppress the maximum distance from the terminals 16 to the recording elements 15 provided to correspond to the ejection port rows to a short distance and reduce voltage drop and signal transmission delay that occur in the wiring unit in the recording element board 10. Moreover, the liquid communication ports 31 of the support member 30 are provided in the recording element board 10 and are opened to extend across all ejection port rows. The other points are the same as those in the first embodiment.

<Structure of Recording Element Board>

Figure 16A:
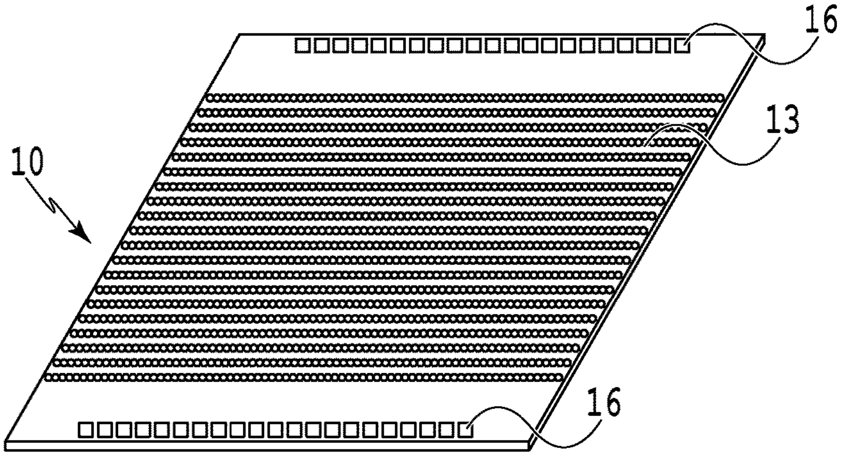
FIGS. 16A to 16C are views illustrating a structure of the recording element board 10.
Figure 16B:
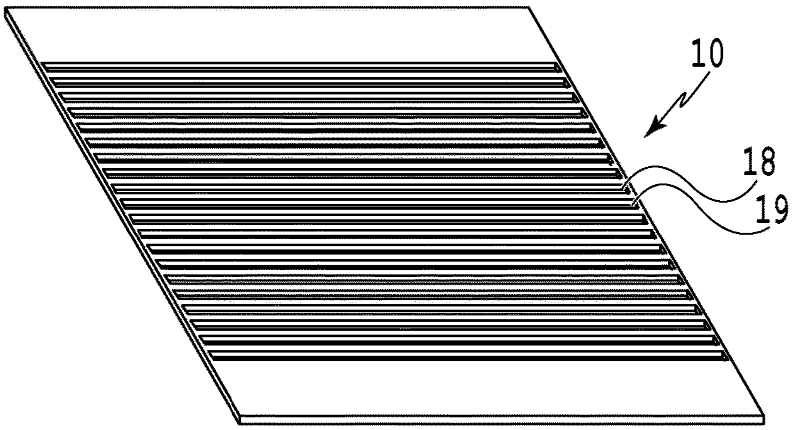
Figure 16C:
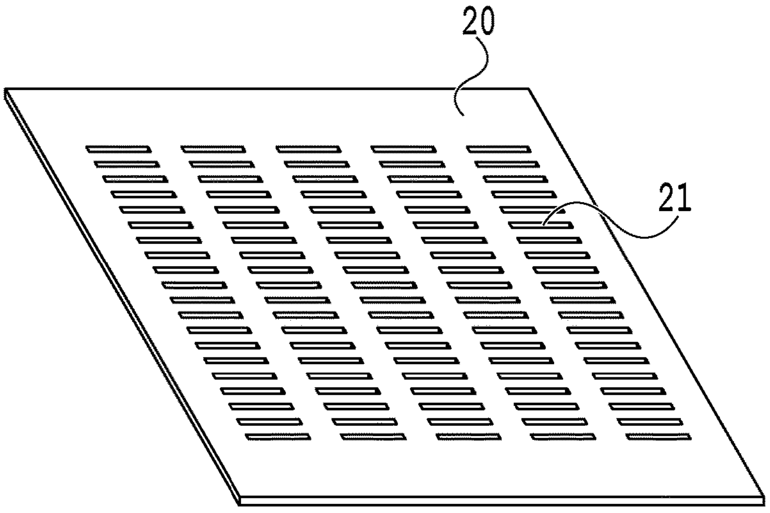

FIG. 16A is a schematic view illustrating a face of the recording element board 10 on the side where the ejection ports 13 are arranged and FIG. 16C is a schematic view illustrating the back face of the face of FIG. 16A. FIG. 16B is a schematic view illustrating a face of the recording element board 10 in the case where the lid member 20 provided on the back face side of the recording element boards 10 is removed in FIG. 16C. As illustrated in FIG. 16B, the liquid supply passages 18 and the liquid collection passages 19 are alternately provided on the back face of the recording element board 10 along the ejection port row direction. Although the number of ejection port rows is far greater than that in the first embodiment, a substantial difference between the present embodiment and the first embodiment is that, as described above, the terminals 16 are arranged in both side portions of the recording element board that extend along the ejection port row direction. The basic configurations such as one set of the liquid supply passage 18 and the liquid collection passage 19 is provided for each ejection port row and the lid member 20 is provided with the openings 21 that communicate with the liquid communication ports 31 of the support member 30 are the same as those in the first embodiment.

Examples of the liquid ejection head 3 of the present disclosure have been described above by using the first and second embodiments. The recording element boards 10 included in the liquid ejection head 3 described herein can have specific configurations of the recording element boards 10 described in the following examples.

First Example

Figure 17A:
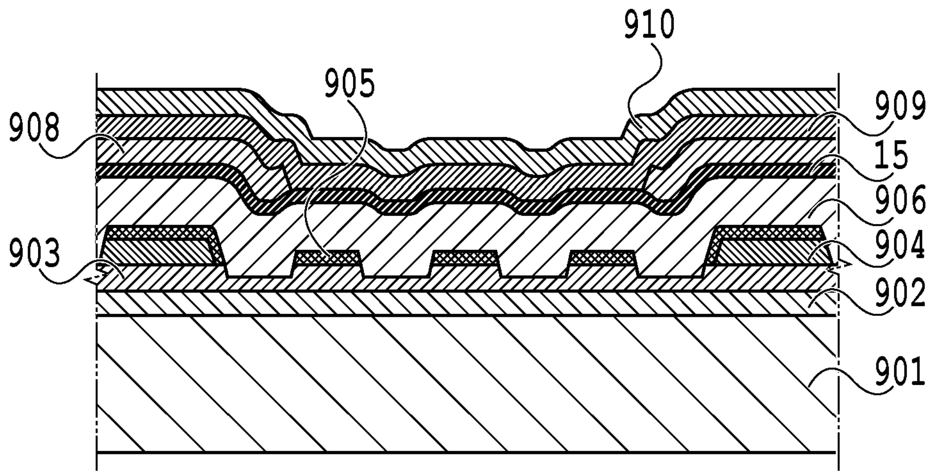
FIGS. 17A and 17B are views illustrating a structure of the recording element board 10 according to a first example.
Figure 17B:
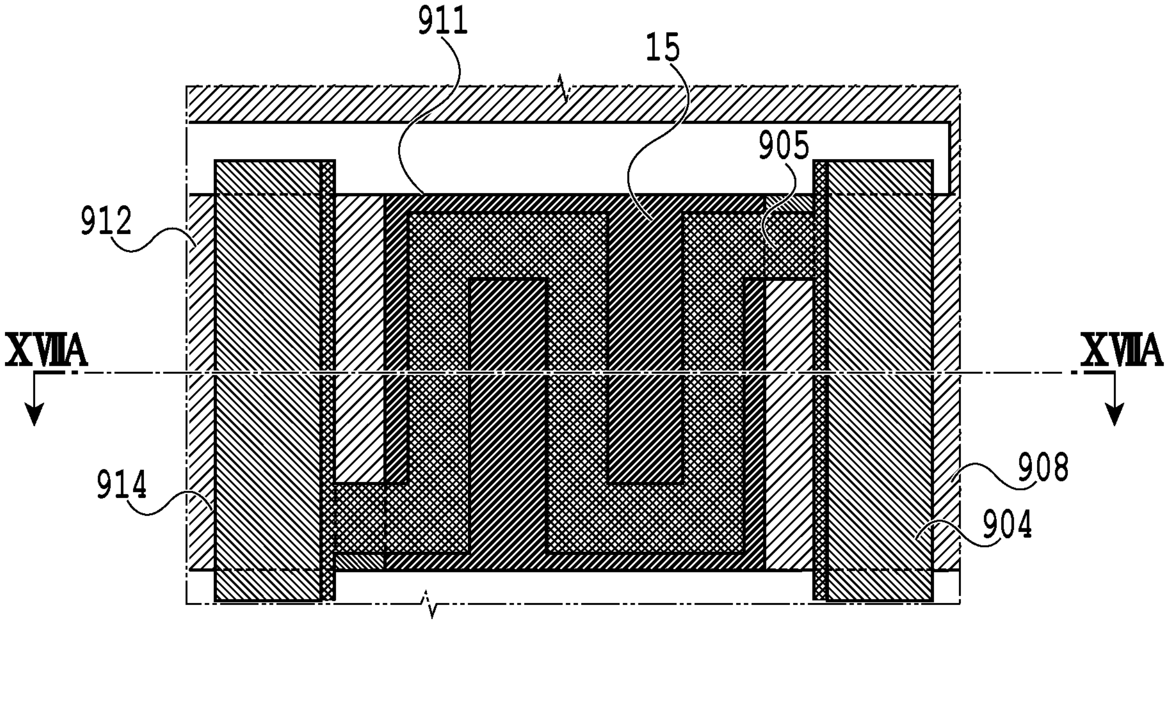

A first example is described below. FIGS. 17A and 17B are views illustrating a structure of the recording element board 10 according to the present example. Specifically, FIG. 17A illustrates a cross-sectional configuration of the heater (heating element) 15 and a temperature detection element 905 forming the recording element in the recording element board 10 and FIG. 17B illustrates a planar configuration of the heater 15 and the temperature detection element 905. Note that FIG. 17A is a cross-sectional view along the XVIIA-XVIIA line in FIG. 17B and FIG. 17B is a see-through view from the Si substrate 901 side for illustrating a positional relationship of the temperature detection element 905. Illustration of a nozzle portion of the ejection port 13 and the like and some of films are omitted for the sake of description.

As illustrated in FIG. 17A, multiple layers are formed on the Si substrate 901 in the recording element board 10. Specifically, an insulating film PSG 903 is formed on the Si substrate 901 via a field oxidation film 902 of $SiO_2$ or the like. The temperature detection element 905 formed of a thin film resistor of Al, Pt, Ti, Ta, or the like is provided on the insulating film PSG 903 and AL1 wiring 904 for connecting and wiring the temperature detection element 905 is provided.

Moreover, an interlayer insulating film 906 of SiO or the like is further provided as an upper layer and the heater 15 of TaSiN or the like that performs electrothermal conversion and AL2 wiring 908 that connects the heater 15 and a drive circuit formed on the Si substrate 901 to each other are provided on the interlayer insulating film 906. In addition, a passivation film 909 of $SiO_2$ or the like and an anti-cavitation film 910 of Ta, Ir, or the like that improves resistance against cavitation above the heater 15 are provided.

As illustrated in FIG. 17B, a region 911 of the heater 15, a region 912 of AL2 wiring that is connected the drive circuit of the heater 15, and a region 914 of AL1 wiring that serves as individual wiring for the temperature detection element 905 are present on a flat surface of the recording element board 10.

The recording element board 10 according to the present embodiment is fabricated in a semiconductor manufacturing process. Specifically, the temperature detection element 905 is placed on the AL1 layer and film formation and patterning are performed to fabricate the recording element board 10. As described above, the recording element board 10 according to the present example can be fabricated without a change in the basic structure of the conventional recording element board.

Although the temperature detection element 905 is illustrated to have a meandering zigzag shape in FIG. 17B, the shape of the temperature detection element is not limited to this and may be, for example, a rectangular shape. A zigzag shape as illustrated in FIG. 17B has the following advantage: the larger the resistance value of the temperature detection element 905 is, the larger the detection signal is; accordingly, the temperature change can be accurately detected.

Figure 18A:
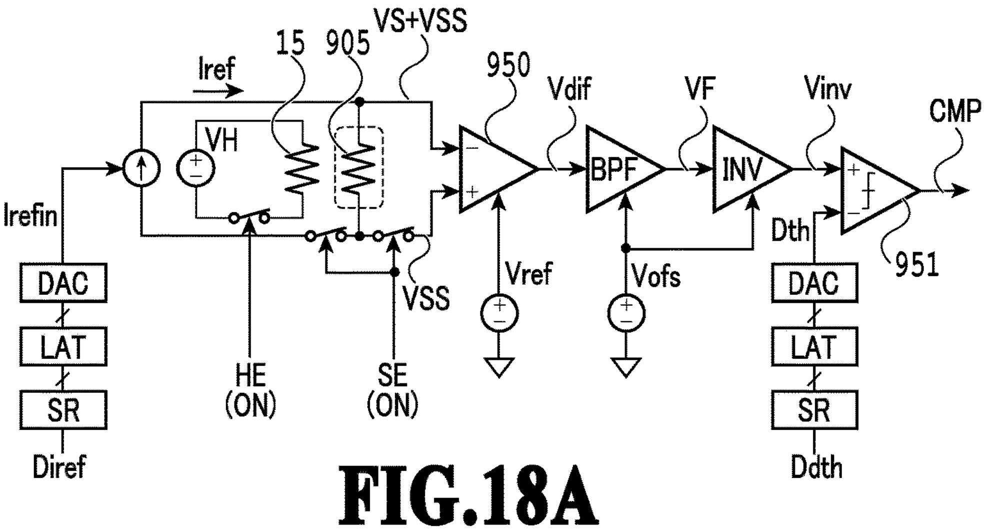
FIGS. 18A to 18D are diagrams for explaining profiles detected by a temperature detection element 905.
Figure 18B:
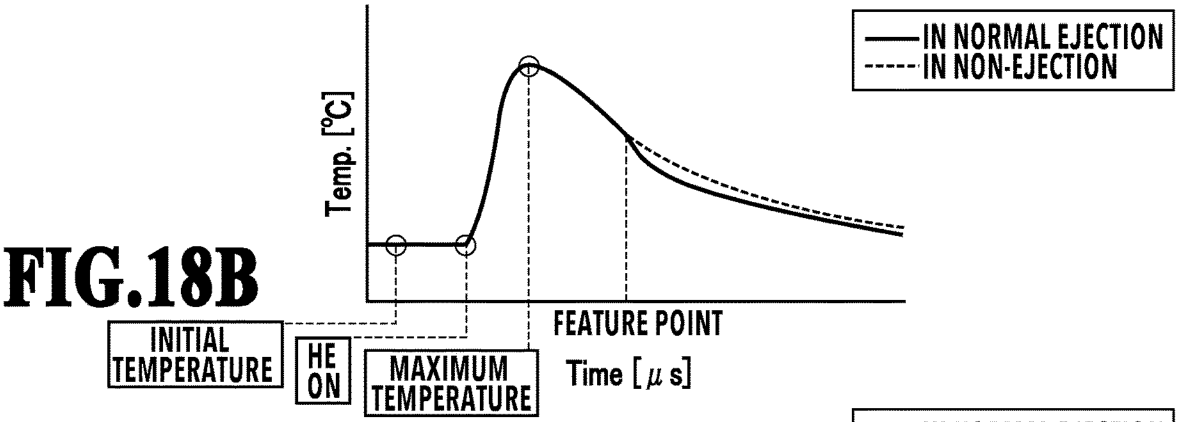

Next, description is given of profiles detected by the temperature detection element 905 in the case where drive voltage for ink ejection is applied to the heater 15 with reference to FIGS. 18A to 18D. FIG. 18A is a circuit diagram for illustrating an outline of a temperature detection process according to the present example and FIG. 18B illustrates temperature profiles in normal ejection and non-ejection, respectively, in the case where the drive voltage is applied to the heater 15.

As illustrated in FIG. 18A, the heater 15 is driven by a constant voltage source. In the case where a heater drive signal HE turns ON (High active), a switch element closes and constant voltage VH is applied to the heater 15. Meanwhile, in the case where the heater drive signal HE turns OFF (Low), the switch element opens and the application of the constant voltage VH to the heater 15 is cut off. As described above, the constant voltage VH is applied to the heater 15 in a square pulse shape depending on ON and OFF of the heater drive signal HE.

Meanwhile, the temperature detection element 905 is a thin film resistor and a constant current source applies a current to the temperature detection element 905. In the case where a sensor selection signal SE turns ON (High active), switch elements close and a constant current Iref is applied to the temperature detection element 905. Simultaneously, voltage signals of both ends of the temperature detection element 905 are inputted into a differential amplifier. Meanwhile, in the case where the sensor selection signal SE turns OFF (Low), the switch elements open and the application of the constant current Iref to the temperature detection element 905 is cut off and the input of the voltage signals of both ends of the temperature detection element 905 into the differential amplifier is also cut off.

For example, the constant current Iref can be set to any of 32 levels from 0.6 mA to 3.7 mA in increments of 0.1 mA. In the following description, setting width of one level is referred to as one rank.

In the case of a range of 32 ranks, a setting value Diref of the constant current Iref is defined as a 5-bit digital value and is transferred to a shift register in synchronization with a not-illustrated clock signal. The setting value Diref is then latched in a latch circuit at a timing of a not-illustrated latch signal and is outputted to a current output type digital-analog converter (DAC).

The output signal of the latch circuit is held until the next latch timing and the next setting value Diref is transferred to the shift register. An output current Irefin of the digital-analog converter (DAC) is inputted into the constant current source and is amplified, for example, 12 times to be outputted as the constant current Iref.

A resistance Rs of the temperature detection element 905 at temperature T is expressed by the following formula (1) in the case where normal temperature is represented by T0, a resistance at this temperature is represented by Rs0, and a temperature coefficient of resistance of the temperature detection element 905 is represented by TCR.

[Math 1]

$$Rs = Rs0\{1+TCR(T-T0)\} \qquad \text{formula (1)}$$

In the case where the constant current Iref is applied to the temperature detection element 905, differential voltage VS between both ends is expressed by the following formula (2).

[Math 2]

$$VS = \mathrm{Iref}\cdot Rs = \mathrm{Iref}\cdot Rs0\{1+TCR(T-T0)\} \qquad \text{formula (2)}$$

The differential voltage VS is inverted and inputted into a differential amplifier 950. However, an output Vdif as it is is negative voltage lower than a ground potential GND and, in actual, is fed back to a negative terminal of an operation amplifier in the differential amplifier 950 to be Vdif=0 V. Accordingly, an unexpected signal is eventually outputted. To avoid this, the constant voltage source applies offset voltage Vref high enough to make the output Vdif equal to or higher than the ground potential GND, to the differential amplifier 950.

Figure 18C:
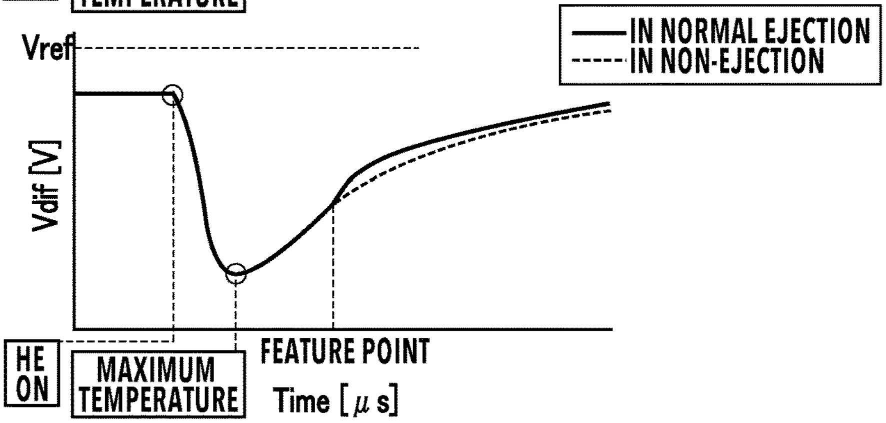

FIG. 18C illustrates Vdif profiles in the normal ejection and the non-ejection, respectively, in the cases of the temperature profiles illustrated in FIG. 18B. As illustrated in FIGS. 18B and 18C, the waveforms of the Vdif profiles are inverted upside down with respect to the waveforms of the temperature profiles. Accordingly, the case where the tilt of the waveform of the Vdif profile is negative indicates a temperature rise instance and the case where the tilt is positive indicates a temperature drop instance.

As illustrated in FIGS. 18B and 18C, in the normal ejection, there appears a feature point at which part of an ejected liquid droplet falls on the heater 15 due to contraction of bubbles after bubble generation and the temperature of the heater 15 rapidly drops due to this falling. Meanwhile, in the non-ejection, there is no such falling of liquid droplets. Accordingly, the temperature smoothly changes and no feature point appears. Note that, in the present example, the CPU of the recording apparatus 1000 performs, for example, a differential operation on a temperature curve illustrating a relationship between elapsed time and temperature as illustrated in FIG. 18B. The CPU of the recording apparatus 1000 thereby obtains information on the feature point such as existence or non-existence (presence or absence) of the feature point and time and temperature at which the feature point has appeared. Then, the CPU of the recording apparatus 1000 can determine that the ejection is normal in the case where the CPU can detect the feature point, and determine that the ejection is not performed in the case where the CPU cannot detect the feature point.

The output Vdif of the differential amplifier 950 as described above is then inputted into a filter circuit. The filter circuit is a circuit for converting the maximum gradient in the temperature drop expressing the ejection state in Vdif to a peak and is formed of a band pass filter (BPF) in which a second-order low pass filter and a first-order high pass filter are connected in a cascade. The low pass filter attenuates high-frequency noise in a range above a cutoff frequency fcL and the high pass filter extracts the gradient in the temperature drop by performing first-order differentiation in a range below a cutoff frequency fcH to remove DC components.

The aforementioned signal process by the filter circuit causes the filter circuit to output a signal VF used in the determination of normal ejection or non-ejection.

Note that, since the signal VF may take negative voltage lower than the ground potential GND also in this case, a constant voltage source applies offset voltage Vofs high enough to make the signal VF equal to or higher than the ground potential GND to a positive terminal as described above.

Since the high pass filter attenuates a low range signal and output voltage decreases, the output signal VF of the filter circuit is amplified in an inverting amplifier (INV) in a later stage.

Since the input signal VF of positive voltage is inverted and becomes negative voltage in the inverting amplifier (INV), offset voltage is applied as in the high pass filter to step up the signal.

In this case, output of the constant voltage source that applies the offset voltage Vofs to the high pass filter is branched and the same offset voltage Vofs is applied also to the inverting amplifier (INV).

As a result, an output signal Vinv of the inverting amplifier (INV) is as in the following formula (3) in the case where an amplification factor of the inverting amplifier (INV) is represented by Ginv.

[Math 3]

$$Vinv=Vofs+Ginv(Vofs-VF) \quad \text{formula (3)}$$

Figure 18D:
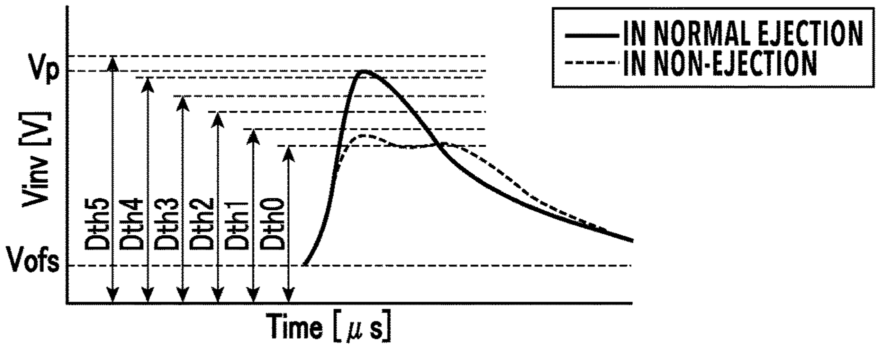

FIG. 18D illustrates Vinv profiles in the normal ejection and the non-ejection, respectively. In the normal ejection, a peak Vp attributable to the maximum temperature drop rate after the feature point appears. In the non-ejection, no feature point appears and the temperature drop rate is thus low. A peak appearing in the waveform in the non-ejection is smaller than that in the waveform in the normal ejection.

The output signal Vinv of the inverting amplifier (INV) is inputted into a positive terminal of a comparator 951 and is compared with threshold voltage Dth inputted into a negative terminal and, in the case of Vinv>Dth, a signal CMP to be effective is outputted.

For example, the threshold voltage Dth can be set to any of 256 ranks from 0.5 V to 2.54V in increments of 8 mV. In the case of a range of 256 ranks, a setting value Ddth of the threshold voltage Dth is defined as an 8-bit digital value and is transferred to a shift register in synchronization with the not-illustrated clock signal. The setting value Ddth is then latched in a latch circuit at a timing of a not-illustrated latch signal and is outputted to a voltage output type digital-analog converter (DAC). The output signal of the latch circuit is held until the next latch timing and the next setting value Ddth is transferred to the shift register in this period.

Detection of the peak voltage Vp of Vinv is performed in a procedure described below by using the comparator 951. Firstly, in a first latch period, the drive pulse is applied to the heater 15 with a constant current Iref0 (for example 1.6 mA) corresponding to a reference setting value Diref0 applied to the temperature detection element 905. In this case, a reference setting value Ddth0 corresponding threshold voltage Dth0 to be a reference is inputted into the comparator 951 and is compared with the peak of Vinv.

In the case where the determination pulse CMP is outputted, the rank of Dth is incremented by one in the next latch period and Dth is compared with the peak of Vinv in a similar way.

This operation is repeated until the determination pulse CMP is not outputted and Dth of the last rank at which the determination pulse CMP is outputted is set as the peak voltage Vp. For example, assume the case where the peak voltage Vp in the normal ejection in FIG. 18D is desired to be detected. Dth is sequentially increased from Dth0 to Dth1, to Dth2, and so on. Then, no determination pulse CMP is outputted at Dth5. Accordingly, Dth4 at which the determination pulse CMP is outputted last is set as Vp.

Meanwhile, in the case where no determination pulse CMP is outputted in the first latch period, the rank of Dth in the next latch period is decremented by one and Dth is compared with the peak of Vinv in a similar manner.

This is repeated until the determination pulse CMP is outputted and Dth of the rank at which the determination pulse CMP is outputted is set as the peak voltage Vp. In the example of the normal ejection in FIG. 18D, in the case where Dth is reduced to Dth5 and to Dth4, the determination pulse CMP is outputted at Dth4. Accordingly, Dth4 is set as Vp.

Figure 19A:
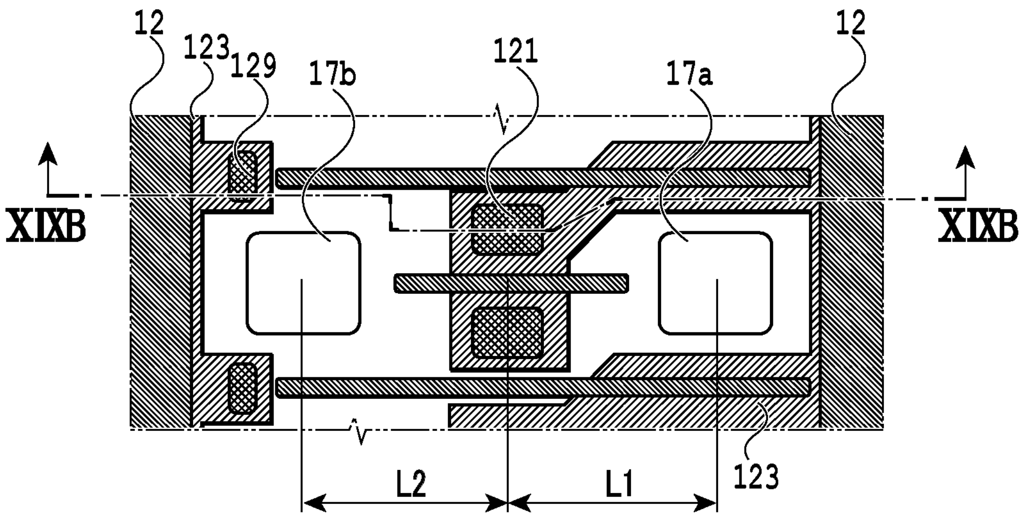
FIGS. 19A and 19B are views illustrating a structure of a heat applying portion in the recording element board 10.
Figure 19B:
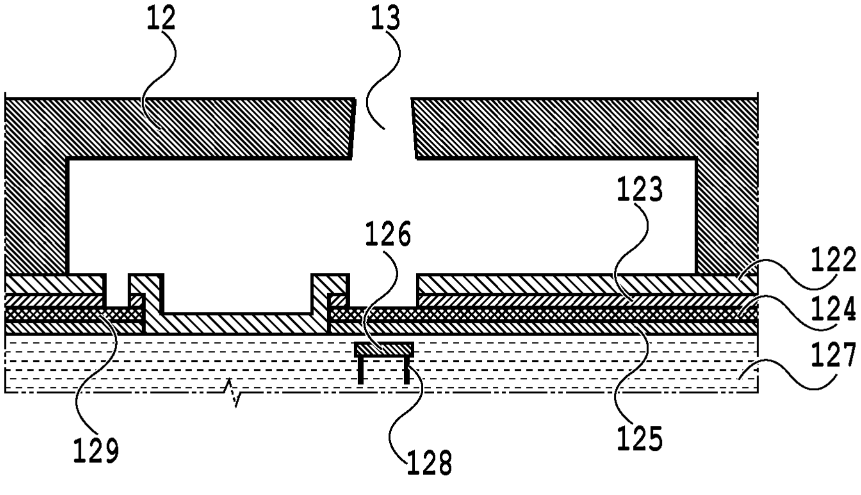

A structure of a heat applying portion in the recording element board according to the present embodiment is described below by using FIGS. 19A and 19B. FIG. 19A is a plan view schematically illustrating a region around the heat applying portion in the recording element board 10 in an enlarged manner. Moreover, FIG. 19B is a cross-sectional view along the one-dot chain line XIXB-XIXB in FIG. 19A. Although a stacking configuration of the board in these figures is different from the example described in FIGS. 17A and 17B, either configuration can be applied as the stacking configuration of the recording element board.

The recording element board of the liquid ejection head is formed by stacking multiple layers one on top of another on a substrate made of silicon. In the present embodiment, a heat accumulating layer made of a thermally oxidized film, an SiO film, a SiN film, or the like is arranged on the substrate. Moreover, a heating resistive element 126 is arranged on the heat accumulating layer and an electrode wiring layer (not illustrated) serving as wiring made of a metal material such as Al, Al—Si, Al—Cu, or the like is connected to the heating resistive element 126 via a tungsten plug 128. As illustrated in FIG. 19B, an insulating protection layer 127 (first protection layer) is arranged on the heating resistive element 126. The insulating protection layer 127 is provided above the heating resistive element 126 so as to block contact between the heating resistive element 126 and the liquid by covering the heating resistive element 126. The insulating protection layer 127 is an insulating layer made of a SiO film, a SiN film, or the like.

A protection layer is arranged on the insulating protection layer 127. This protection layer on the insulating protection layer 127 includes a lower protection layer 125, an upper protection layer 124 (second protection layer), and an adhering protection layer 123. In the present embodiment, the lower protection layer 125 and the upper protection layer 124 are provided on the heating resistive element 126 and protect a surface of the heating resistive element 126 from chemical and physical impacts that occur with the heating of the heating resistive element 126. Accordingly, such protection layers cover at least a portion directly above the heater 15 that is heated by the heater 15. This portion is referred to as heat applying portion.

In the present embodiment, the lower protection layer 125 is made of tantalum (Ta), the upper protection layer 124 is made of iridium (Ir), and the adhering protection layer 123 is made of tantalum (Ta). Moreover, the protection layers made of these materials are electively conductive. A protection layer 122 for improving adhesion to the ejection port forming member 12 is arranged on the adhering protection layer 123 as a liquid resistant body. The protection layer 122 is made of SiC.

In the case where the liquid is ejected, an upper portion of the upper protection layer 124 is in contact with the liquid and is in a harsh environment in which bubbles are generated by instantaneous temperature rise of the liquid in the upper portion and disappear in this portion to cause cavitation. Accordingly, in the present embodiment, the upper protection layer 124 made of an iridium material with high corrosion resistance and high reliability is formed and comes into contact with the liquid at a position corresponding to the heating resistive element 126.

Moreover, the recording apparatus 1000 according to the present embodiment performs a kogation suppression process for suppressing kogation deposited on the upper protection layer 124 on the heating resistive element 126 is performed during the printing. Specifically, a portion of the upper protection layer 124 is set as one electrode 121 (first electrode) and an opposing electrode 129 (second electrode) corresponding to the electrode 121 is provided to form an electric field through the liquid in a liquid chamber. Particles such as pigment charged to a negative potential in the liquid are thereby repelled from the surface of the upper protection layer 124 on the heating resistive element 126. Reducing the presence ratio of the particles such as pigment charged to a negative potential near the surface of the upper protection layer 124 as described above suppresses kogation deposited on the upper protection layer 124 on the heating resistive element 126 during printing. Such kogation suppression is performed in mind of the following fact: kogation is a phenomenon that occurs in the case where a color material, additives, and the like contained in the liquid are heated to high temperature to be decomposed at a molecular level, change to low-solubility substances, and are physically adsorbed onto the upper protection layer. Reducing the presence ratio of the color material, additives, and the like that cause kogation near the surface of the upper protection layer 124 on the heating resistive element 126 in the high-temperature heating of the upper protection layer 124 leads to suppression of kogation.

For example, a potential difference between the electrode 121 and the opposing electrode 129 is preferably about 0.2 to 2.5 V. This is due to the following reason: assume that the upper protection layer 124 is made of iridium; in this configuration, electrochemical reaction between the electrode 121 and the liquid occurs in the case where the potential difference between both electrodes exceeds 2.5 V, and the surface of the electrode 121 dissolves into the liquid; accordingly, the potential level is preferably set to a level at which the electrode 121 does not dissolve. Specifically, the state in this case is such that, although an electric field is formed between the electrode 121 in the upper protection layer and the opposing electrode 129 through the liquid, no current is flowing therebetween. Since the electrode 121 in the upper protection layer has a negative potential with respect to the opposing electrode 129, the particles charged to the negative potential are repelled from the surface of the electrode 121 in the upper protection layer and the presence ratio of the particles near the surface of the electrode 121 in the upper protection layer decreases.

Note that, in the following description, a mode in which the method of determining ejection or non-ejection as described above is used is referred to as non-ejection determination mode and a mode in printing in which this method is not used is referred to as printing mode. Moreover, there is performed potential control in which a potential difference between the upper protection layer 124 and the opposing electrode 129 through the liquid is adjusted. Furthermore, in the present example, in the non-ejection determination mode, potential control in which kogation is not suppressed is performed as the potential control performed by forming an electric field through the liquid in the upper protection layer 124 and the opposing electrode 129, unlike in the printing mode. Alternatively, in the non-ejection determination mode, a potential difference between the electrode 121 and the opposing electrode 129 is set such that a degree at which the particles in the liquid that cause kogation are repelled from the electrode 121 is reduced from that in the printing mode.

Figure 20A:
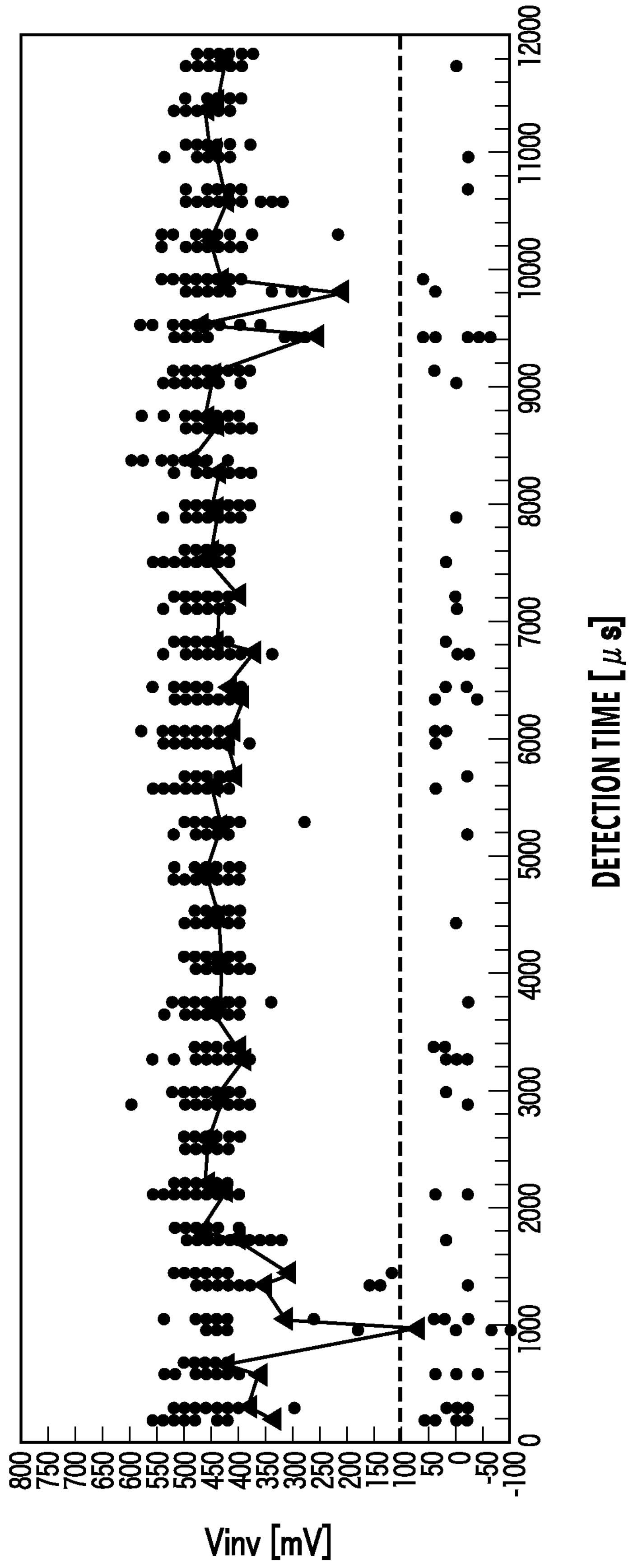
FIGS. 20A and 20B are diagrams illustrating a relationship between detection time and Vinv.
Figure 20B:
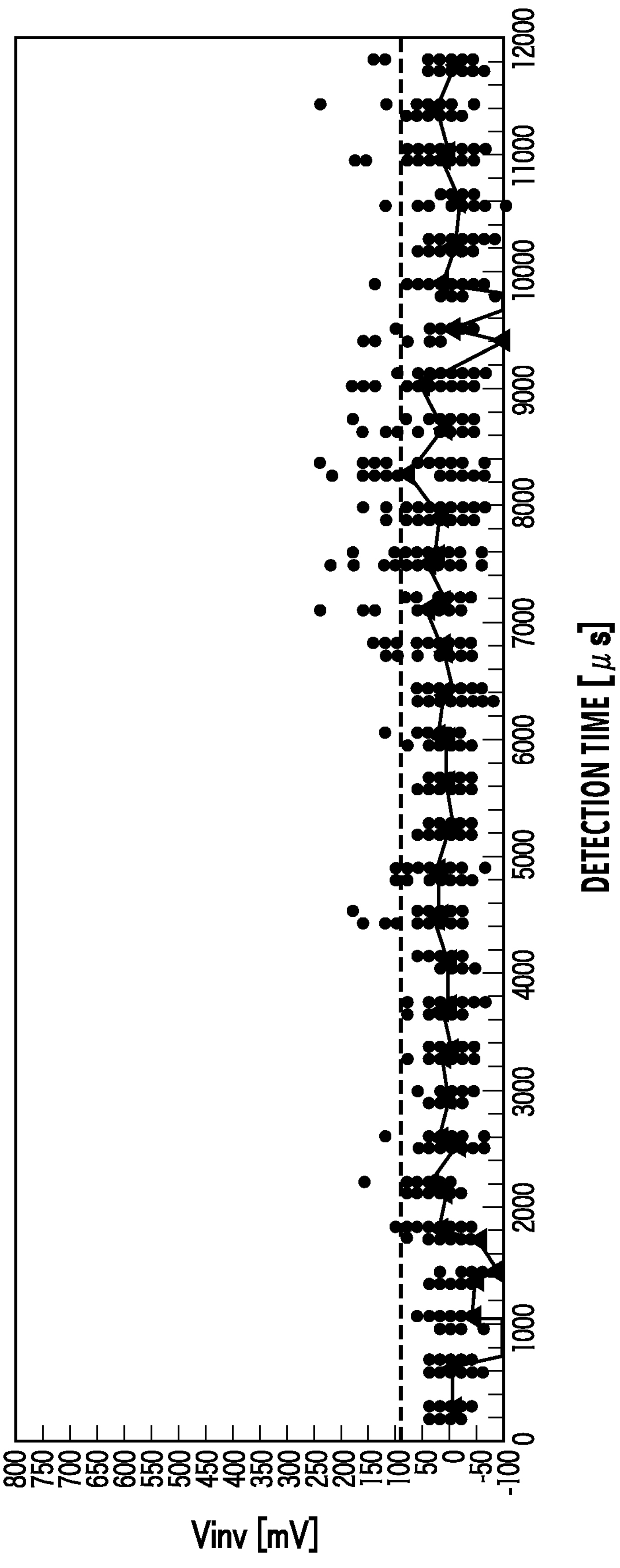

The graph of FIG. 20B is an example of a graph expressing a relationship between the detection time and Vinv in the printing mode as a comparative example and Vinv is obtained for a total of 256 heaters in such a way that Vinv is obtained for eight heaters each time and the heaters for which Vinv is obtained are changed about every 400 μs. In the present comparative example, the upper protection layer 124 is set to the ground potential and 1.9 V is applied to the opposing electrode 129. In the printing mode, since the potential control for suppressing kogation is performed, generated bubbles are relatively large and an amount of part of an ejected liquid droplet that falls on the heater 15 due to contraction of bubbles is relatively small. Accordingly, Vinv that is an output value of the feature point where the temperature of the heater 15 rapidly drops is relatively low. In the case where the output value is low, the determination of the ejection state may not be accurately performed.

Note that a distance between the heater surface and the nozzle surface in the present comparative example is about 9.5 μm and the ejection speed in the printing mode is about 12 m/s. A detection rate tends to decrease in the case where the distance between the heater surface and the nozzle surface is smaller than about 22 μm and this tendency appears more significantly in the case where the distance is smaller than about 12 μm. Moreover, the detection rate tends to decrease in the case where the ejection speed is higher than about 10 m/s and this tendency appears more significantly in the case where the ejection speed is higher than about 12 m/s.

The graph of FIG. 20A is an example of a graph expressing a relationship between the detection time and Vinv in the case where the mode is switched from the printing mode to the non-ejection determination mode and the potential control in which kogation is not suppressed is performed. In the present example, 1.8 V is applied to the upper protection layer 124 and 1.9 V is applied to the opposing electrode 129. Since kogation is not suppressed (or degree of suppression is reduced), generated bubbles are relatively small and an amount of part of an ejected liquid droplet that falls on the heater 15 due to contraction of bubbles is relatively large.

Accordingly, Vinv that is an output value of the feature point where the temperature of the heater 15 rapidly drops is relatively high.

As described above, the recording apparatus and the control method of the recording apparatus that can appropriately and accurately perform determination of the ejection state or determination of occurrence of ejection failure in each recording element can be achieved.

Although the circulating configuration is employed in the present example, the technical idea according to the present example can be applied to configurations other than the circulating configuration.

Second Example

Figure 21A:
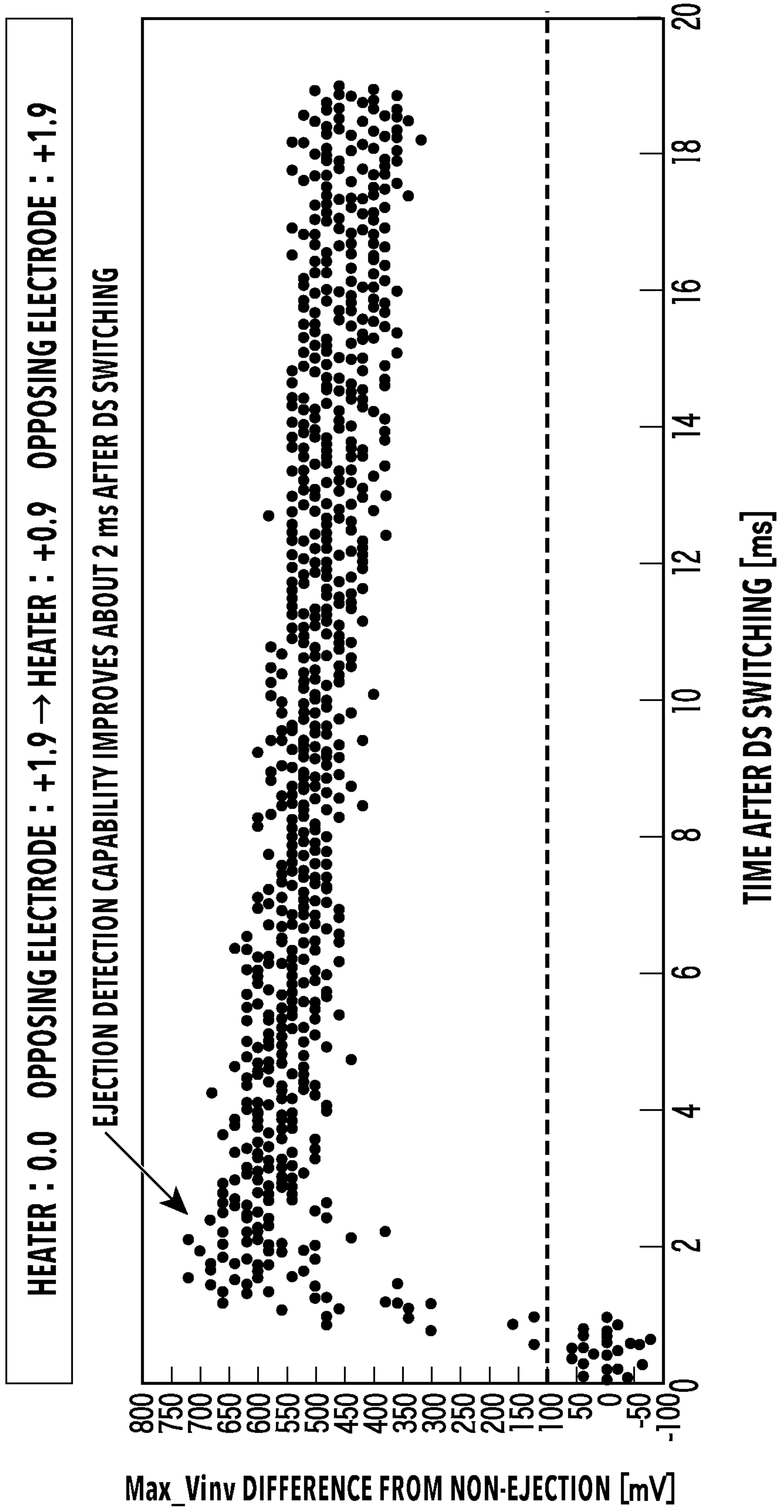
FIGS. 21A and 21B are diagrams illustrating a relationship between Vinv and elapsed time after potential control switching.
Figure 21B:
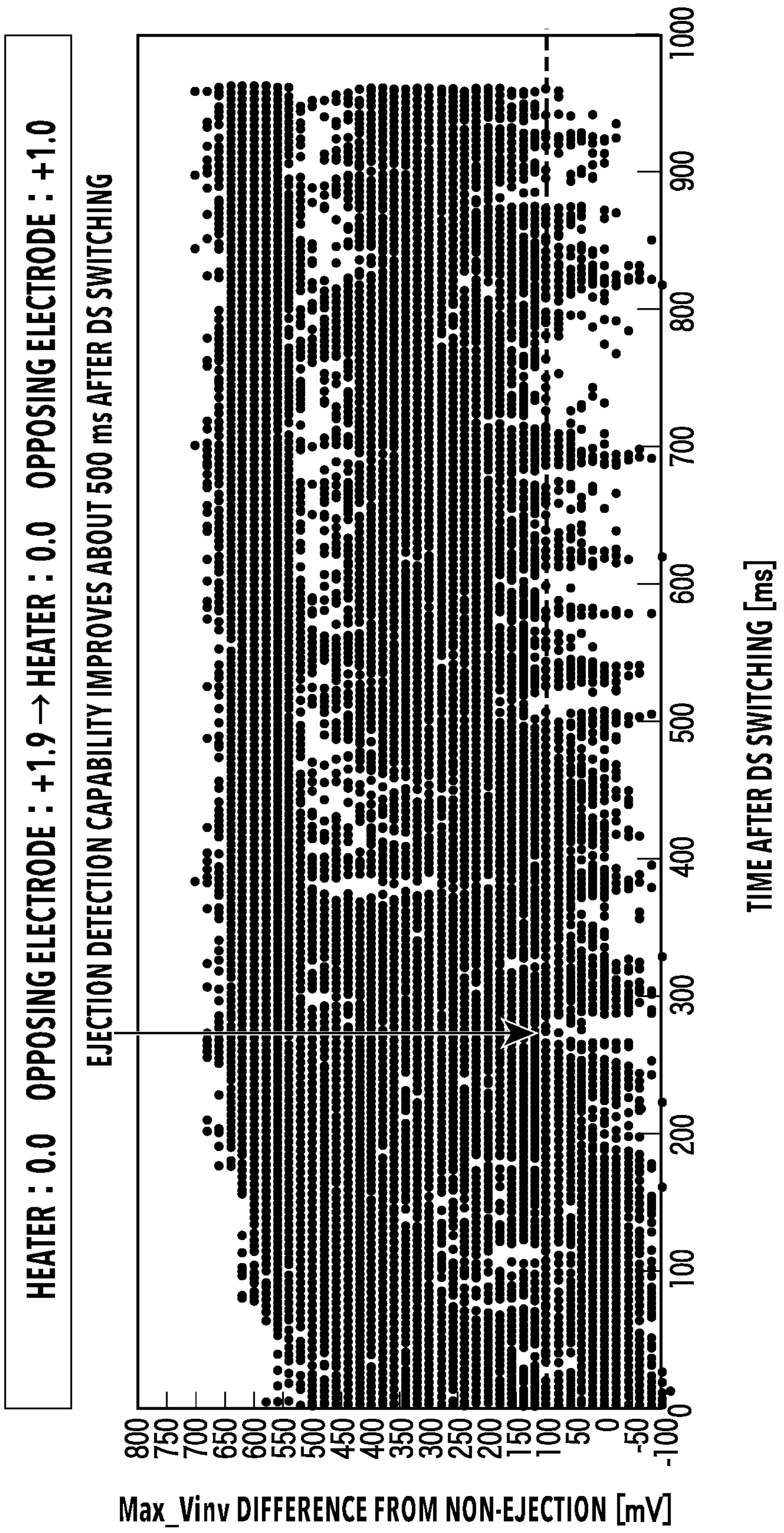

Graphs of FIGS. 21A and 21B are each a graph illustrating a relationship between Vinv and elapsed time after potential control switching for multiple heaters. In both of FIGS. 21A and 21B, the potential of the upper protection layer 124 is set to the ground potential and 1.9 V is applied to the opposing electrode 129 in the printing mode and then potential switching by potential control is performed.

Specifically, in FIG. 21A, switching of the potential of the upper protection layer 124 by applying 0.9 V is performed with the potential of the opposing electrode 129 maintained at 1.9 V. Vinv increases to a value sufficient for detection 2 ms after such switching. Meanwhile, in FIG. 21B, switching of the potential of the opposing electrode 129 by applying 1.0 V is performed with the potential of the upper protection layer 124 maintained at the ground potential. In such switching, Vinv takes about 500 ms after the switching to increase to a value sufficient for detection. Although the potential difference between the upper protection layer and the opposing electrode after the switching is 1.0 V in both of FIGS. 21A and 21B, higher response is achieved in the case where the potential is switched on the upper protection layer side closer to a kogation attaching portion. Moreover, in the case where no switching is performed, Vinv takes very long time to increase to the value sufficient for detection. As described above, although the target of potential switching may be either the upper protection layer or the opposing electrode, switching of the potential of the upper protection layer with high response is desirable.

Moreover, switching the potential of one electrode as described above can simplify the apparatus than in the case where potentials of both electrodes are switched. However, for example, an optimal combination of the potentials of the upper protection layer and the opposing electrode in the printing mode and the potentials of the upper protection layer and the opposing electrode in the non-ejection determination mode may vary depending on a design balance of the recording apparatus as a whole, an environment in which the recording apparatus is installed, the type of ink, and the like (FIG. 22). In such a case, the potential of the upper protection layer and the potential of the opposing electrode may be simultaneously switched. However, in the case where one of the potentials needs to be switched first, it is desirable to switch the potential of the upper protection layer first.

<Condition Examples>

Various condition examples are described below by using FIG. 22.

A condition example (1) illustrates a case where only the potential of the upper protection layer is changed between the printing mode and the non-ejection determination mode.

A condition example (2) illustrates a case where only the potential of the upper protection layer is changed between the different modes and the potential difference between the upper protection layer and the opposing electrode in the non-ejection determination mode is larger than that in the condition example (1). In both of the upper protection layer and the opposing electrode, the smaller the potential change amount is, the shorter the time required for the potential change is. Accordingly, a smaller potential change amount in each electrode is more desirable as long as the potential difference between the upper protection layer and the opposing electrode is sufficient for obtaining a necessary detection rate.

Condition examples (3) to (6) are variations in which the change amount of the potential between the different modes is further reduced from that in the condition example (2). Assume a case where the smaller the potential difference between the upper protection layer and the opposing electrode is, the more the detection rate is improved. In this case, as described above, the greater the potential change amount in the upper protection layer is, the longer the time it takes for the potential change is but the more the detection rate is improved. Accordingly, the change amount of the potential of the upper protection layer is desirably set as small as possible depending on the necessary detection rate.

A condition example (7) illustrates a case where the potential of the upper protection layer is fixed to the ground potential and the potential of the opposing electrode is changed. In the case where the potential of the upper protection layer is desired to be fixed to the ground potential, appropriate effects can be obtained also by adjusting the potential change amount of the opposing electrode.

A condition example (8) illustrates a case where the potential change amount of the opposing electrode is larger than that in the condition example (7). The detection rate after the potential difference change between the different modes gradually increases. Although the potential takes longer time to change between the different modes in the condition example (8) than in the condition example (7), since the potential difference between the upper protection layer and the opposing electrode is large, time it takes to obtain the effect of the detection rate improvement after the potential change is shorter.

A condition example (9) illustrates a case where the potential of the upper protection layer and the potential of the opposing electrode are simultaneously switched in transition between the printing mode and the non-ejection determination mode.

A condition example (10) illustrates a case where only the potential of the upper protection layer is changed between the different modes.

A condition example (11) illustrates a case where the potential difference between the upper protection layer and the opposing electrode increases in transition from the printing mode to the non-ejection determination mode. Regarding the optimal potential difference for the condition of not suppressing kogation, reducing the potential difference is not necessarily good and increasing the potential difference is sometimes better depending on conditions.

Note that the contents of the first to second embodiment may be used in combination as appropriate.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure can provide a technique for grasping the ejection state in the recording element and accurately performing determination of ejection failure occurrence.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-112990, filed Jul. 7, 2021, which is hereby incorporated by reference herein in its entirety.

What is claimed is:

1. A recording apparatus comprising:

a liquid ejection head including (1) a heating element that generates thermal energy required to eject liquid, the liquid including pigment charged to a negative potential, (2) a first protection layer that blocks contact between the heating element and the liquid, (3) a second protection layer that covers at least a portion of the first protection layer to be heated by the heating element and that functions as a first electrode, (4) a second electrode that is electrically connected to the first electrode through the liquid, (5) an ejection port that ejects the liquid, and (6) a temperature detection element that corresponds to the heating element;

a detection unit configured to detect a feature point in a temperature curve that is obtained by the temperature detection element and that indicates a relationship between time and temperature; and a determination unit configured to determine whether or not the liquid is normally ejected from the ejection port based on whether or not the detection unit has detected the feature point in the temperature curve, wherein the recording apparatus has (1) a non-ejection determination mode using the determination unit and (2) a printing mode in which printing is performed without using the determination unit, wherein in the printing mode, a potential set for the first electrode and a potential set for the second electrode are controlled so that an electric field that reduces a presence ratio of the pigment near a surface of the second protection layer is formed between the first electrode and the second electrode, and wherein in the non-ejection determination mode, the potential set for the first electrode and the potential set for the second electrode are made different from that under potential control in the printing mode.

2. The recording apparatus according to claim 1, wherein the detection unit detects the feature point by performing a differential operation on the temperature curve.

3. The recording apparatus according to claim 1, wherein the recording apparatus operates in the printing mode in a case where printing is to be performed, and operates in the non-ejection determination mode in a case where the feature point is to be detected.

4. The recording apparatus according to claim 3, wherein, in the case where the potential of the first electrode and the potential of the second electrode are to be switched in switching between the printing mode and the non-ejection determination mode, the potential of the first electrode is changed before the potential of the second electrode.

5. The recording apparatus according to claim 3, wherein, in switching between the printing mode and the non-ejection determination mode, the potential of the second electrode is not changed and only the potential of the first electrode is changed.

6. The recording apparatus according to claim 3, wherein a potential difference between the potential set for the first electrode and the potential set for the second electrode in the printing mode is larger than that in the non-ejection determination mode.

7. The recording apparatus according to claim 1, wherein the liquid ejection head further includes a pressure chamber, wherein a supply flow passage that supplies the liquid to the pressure chamber and a collection flow passage that collects the liquid from the pressure chamber communicate with the pressure chamber, and wherein the liquid circulates by flowing through the supply flow passage, the pressure chamber, and the collection flow passage in this order.

8. The recording apparatus according to claim 1, wherein the heating element and the temperature detection element are provided at different positions in a direction in which the liquid is ejected, and wherein the temperature detection element has a meandering shape.

9. The recording apparatus according to claim 1, wherein, in switching between the printing mode and the non-ejection determination mode, the potential of the second electrode is not changed and only the potential of the first electrode is changed.

10. The recording apparatus according to claim 1, wherein, in switching between the printing mode and the non-ejection determination mode, the potential of the first electrode is not changed and only the potential of the second electrode is changed.

11. The recording apparatus according to claim 1, wherein, in switching between the printing mode and the non-ejection determination mode, the potential of the first electrode is changed and the potential of the second electrode is changed.

12. A control method of a recording apparatus, the recording apparatus including a liquid ejection head including (1) a heating element that generates thermal energy required to eject liquid, the liquid including pigment charged to a negative potential, (2) a first protection layer that blocks contact between the heating element and the liquid, (3) a second protection layer that covers at least a portion of the first protection layer to be heated by the heating element and that functions as a first electrode, (4) a second electrode that is electrically connected to the first electrode through the liquid, (5) an ejection port that ejects the liquid, and (6) a temperature detection element that corresponds to the heating element, the control method comprising:

detecting a feature point in a temperature curve that is obtained by the temperature detection element and that indicates a relationship between time and temperature, wherein the recording apparatus has (1) a non-ejection determination mode in which a determination as to whether or not the liquid is normally ejected from the ejection port is made, based on whether or not the detecting has detected the feature point in the temperature curve, and (2) a printing mode in which printing is performed without making the determination, wherein in the printing mode, a potential set for the first electrode and a potential set for the second electrode are controlled so that an electric field that reduces a presence ratio of the pigment near a surface of the second protection layer is formed between the first electrode and the second electrode, and wherein in the non-ejection determination mode, the potential set for the first electrode and the potential set for the second electrode are made different from that under potential control in the printing mode.

13. The control method according to claim 12, wherein, in switching between the printing mode and the non-ejection determination mode, the potential of the second electrode is not changed and only the potential of the first electrode is changed.

14. The control method according to claim 12, wherein, in switching between the printing mode and the non-ejection determination mode, the potential of the first electrode is not changed and only the potential of the second electrode is changed.

15. The control method according to claim 12, wherein, in switching between the printing mode and the non-ejection determination mode, the potential of the first electrode is changed and the potential of the second electrode is changed.

* * * * *